United States Patent
Mooring et al.

(10) Patent No.: US 9,940,174 B2
(45) Date of Patent: *Apr. 10, 2018

(54) SYSTEMS AND METHODS INVOLVING FEATURES OF HARDWARE VIRTUALIZATION, HYPERVISOR, APIS OF INTEREST, AND/OR OTHER FEATURES

(71) Applicant: Lynx Software Technologies, Inc., San Jose, CA (US)

(72) Inventors: Edward T. Mooring, Santa Clara, CA (US); Phillip Yankovsky, Campbell, CA (US); Craig Howard, Belmont, CA (US)

(73) Assignee: Lynx Software Technologies, Inc., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/970,455

(22) Filed: Dec. 15, 2015

(65) Prior Publication Data
US 2016/0203029 A1 Jul. 14, 2016

Related U.S. Application Data

(63) Continuation of application No. 14/714,233, filed on May 15, 2015, now Pat. No. 9,213,840.
(Continued)

(51) Int. Cl.
*G06F 9/50* (2006.01)
*G06F 21/56* (2013.01)
(Continued)

(52) U.S. Cl.
CPC ............ *G06F 9/5077* (2013.01); *G06F 9/455* (2013.01); *G06F 9/4555* (2013.01);
(Continued)

(58) Field of Classification Search
CPC .... G06F 9/5077; G06F 21/567; G06F 21/554; G06F 21/53; G06F 9/45533; G06F 9/455;
(Continued)

(56) References Cited

U.S. PATENT DOCUMENTS

| 6,049,316 A | 4/2000 | Nolan et al. |
| 7,053,963 B2 | 4/2006 | Neiger et al. |

(Continued)

FOREIGN PATENT DOCUMENTS

| JP | 2010-049627 | 3/2010 |
| RU | 2259582 | 8/2005 |

(Continued)

OTHER PUBLICATIONS

Day, Robert, "Hardware Virtualization Puts on a New Spin on Secure Systems", COTS Journal, http://www.lynuxworks.com/virtualization-hardware.php, Oct. 2010, 6 pgs.*
(Continued)

*Primary Examiner* — Matthew Smithers
(74) *Attorney, Agent, or Firm* — Knobbe Martens Olson & Bear, LLP

(57) ABSTRACT

Systems, methods, computer readable media and articles of manufacture consistent with innovations herein are directed to computer virtualization, computer security and/or memory access. According to some illustrative implementations, innovations herein may utilize and/or involve a separation kernel hypervisor which may include the use of a guest operating system virtual machine protection domain, a virtualization assistance layer, and/or a detection mechanism (which may be proximate in temporal and/or spatial locality to malicious code, but isolated from it), inter alia, for detection and/or notification of, and action by a monitoring guest upon access by a monitored guest to predetermined physical memory locations.

20 Claims, 15 Drawing Sheets

Related U.S. Application Data

(60) Provisional application No. 61/993,291, filed on May 15, 2014.

(51) Int. Cl.
*G06F 21/62* (2013.01)
*G06F 9/455* (2018.01)
*H04L 29/00* (2006.01)
*G06F 21/53* (2013.01)
*G06F 21/55* (2013.01)

(52) U.S. Cl.
CPC ...... *G06F 9/45533* (2013.01); *G06F 9/45558* (2013.01); *G06F 21/53* (2013.01); *G06F 21/554* (2013.01); *G06F 21/567* (2013.01); *G06F 21/6281* (2013.01); *H04L 29/00* (2013.01); *G06F 2009/45587* (2013.01); *G06F 2221/032* (2013.01)

(58) Field of Classification Search
CPC ............. G06F 21/6281; G06F 9/45558; G06F 9/4555; G06F 2221/032; G06F 2009/45587; H04L 29/00
See application file for complete search history.

(56) References Cited

U.S. PATENT DOCUMENTS

| | | | |
|---|---|---|---|
| 7,992,144 B1* | 8/2011 | Hendel | G06F 9/5077 709/250 |
| 8,056,076 B1 | 11/2011 | Hutchins et al. | |
| 8,073,990 B1 | 12/2011 | Baron et al. | |
| 8,141,163 B2 | 3/2012 | Pike | |
| 8,200,796 B1 | 6/2012 | Margulis | |
| 8,352,941 B1 | 1/2013 | Protopopov et al. | |
| 8,370,838 B1 | 2/2013 | Omelyanchuk et al. | |
| 8,458,697 B2 | 6/2013 | Amano et al. | |
| 8,490,086 B1 | 7/2013 | Cook | |
| 8,539,584 B2 | 9/2013 | Ramalingam | |
| 8,549,643 B1 | 10/2013 | Shou | |
| 8,584,211 B1 | 11/2013 | Vetter et al. | |
| 8,745,745 B2* | 6/2014 | Mooring | G06F 9/45558 713/164 |
| 8,977,848 B1* | 3/2015 | Tomlinson | G06F 9/5061 713/166 |
| 9,021,559 B1 | 4/2015 | Vetter | |
| 9,203,855 B1* | 12/2015 | Mooring | G06F 9/45558 |
| 9,218,489 B2* | 12/2015 | Mooring | G06F 9/45558 |
| 9,390,267 B2* | 7/2016 | Mooring | G06F 9/45545 |
| 9,607,151 B2* | 3/2017 | Mooring | G06F 21/566 |
| 9,648,045 B2* | 5/2017 | Mooring | H04L 63/20 |
| 2002/0166059 A1 | 11/2002 | Rickey et al. | |
| 2003/0093682 A1 | 5/2003 | Carmona et al. | |
| 2004/0174352 A1 | 9/2004 | Wang | |
| 2004/0177264 A1 | 9/2004 | Anson | |
| 2004/0221009 A1 | 11/2004 | Cook et al. | |
| 2005/0039180 A1 | 2/2005 | Fultheim et al. | |
| 2005/0105608 A1 | 5/2005 | Coleman et al. | |
| 2005/0210158 A1 | 9/2005 | Cowperthwaite | |
| 2005/0216759 A1 | 9/2005 | Rothman et al. | |
| 2005/0223238 A1 | 10/2005 | Schmid et al. | |
| 2006/0184937 A1 | 8/2006 | Abels | |
| 2007/0050764 A1* | 3/2007 | Traut | G06F 9/45558 718/1 |
| 2007/0057957 A1 | 3/2007 | Wooten | |
| 2007/0089111 A1 | 4/2007 | Robinson et al. | |
| 2007/0136506 A1 | 6/2007 | Traut | |
| 2008/0016570 A1 | 1/2008 | Capalik | |
| 2008/0126820 A1 | 5/2008 | Fraser et al. | |
| 2008/0127336 A1 | 5/2008 | Sun et al. | |
| 2008/0148048 A1* | 6/2008 | Govil | G06F 21/53 713/164 |
| 2008/0215770 A1 | 9/2008 | Liu et al. | |
| 2008/0263659 A1 | 10/2008 | Alme | |
| 2008/0282117 A1 | 11/2008 | Partiani et al. | |
| 2008/0320594 A1 | 12/2008 | Jiang | |
| 2009/0099988 A1 | 4/2009 | Stokes et al. | |
| 2009/0158432 A1 | 6/2009 | Zheng et al. | |
| 2009/0204964 A1 | 8/2009 | Foley et al. | |
| 2009/0254990 A1 | 10/2009 | McGee | |
| 2009/0288167 A1 | 11/2009 | Freericks et al. | |
| 2009/0328225 A1 | 12/2009 | Chambers et al. | |
| 2010/0027552 A1 | 2/2010 | Hill | |
| 2010/0031325 A1 | 2/2010 | Maigne et al. | |
| 2010/0077487 A1 | 3/2010 | Polyakov et al. | |
| 2010/0146267 A1 | 6/2010 | Konetski | |
| 2010/0328064 A1 | 12/2010 | Rogel | |
| 2011/0047543 A1 | 2/2011 | Mohinder | |
| 2011/0126139 A1 | 5/2011 | Jeong | |
| 2011/0141124 A1 | 6/2011 | Halls | |
| 2011/0145886 A1 | 6/2011 | McKenzie et al. | |
| 2011/0145916 A1 | 6/2011 | McKenzie et al. | |
| 2011/0161482 A1 | 6/2011 | Bonola et al. | |
| 2011/0167422 A1* | 7/2011 | Eom | G06F 9/45558 718/1 |
| 2011/0185063 A1 | 7/2011 | Head et al. | |
| 2011/0225458 A1 | 9/2011 | Zuo et al. | |
| 2011/0225655 A1 | 9/2011 | Niemela et al. | |
| 2011/0307888 A1 | 12/2011 | Raj et al. | |
| 2012/0035681 A1 | 2/2012 | Maximilien | |
| 2012/0066680 A1 | 3/2012 | Amano et al. | |
| 2012/0185913 A1 | 7/2012 | Martinez et al. | |
| 2013/0024940 A1 | 1/2013 | Hutchins et al. | |
| 2013/0097356 A1 | 4/2013 | Dang et al. | |
| 2013/0312099 A1 | 11/2013 | Edwards et al. | |
| 2013/0347131 A1 | 12/2013 | Mooring et al. | |
| 2014/0059680 A1 | 2/2014 | Kurien et al. | |
| 2014/0173600 A1 | 6/2014 | Ramakrishnan Nair | |
| 2014/0380425 A1 | 12/2014 | Lockett | |
| 2017/0068560 A1* | 3/2017 | Mooring | G06F 9/45545 |

FOREIGN PATENT DOCUMENTS

| | | |
|---|---|---|
| WO | WO 2008/091452 | 7/2008 |
| WO | WO 2010/021631 | 2/2010 |
| WO | WO 2012/177464 | 12/2012 |
| WO | WO 2016/004263 | 1/2016 |

OTHER PUBLICATIONS

Dam et al., "Formal Verification of Information Flow Security for a Simple ARM-based Separation Kernel," ACM, Nov. 2013, pp. 223-234.

Day et al., "Secure Virtualization combines Traditional Desktop Oss and Embedded RTOSs in Military Embedded Systems", Military Embedded Systems, May 2010, 10 pgs. http://www.lynx.com/whitepaper/secure-virtualization-combines-traditional-desktop-oss-and-embedded-rtoss-in-military-embedded-systems/.

Day et al., "Virtualization: Keeping Embedded software Safe and Secure in an Unsafe World Secure Virtualization for Real-time, Linux and Windows Systems," EE Times, Jun. 2010, pp. 1-3 http://www.lynuxworks.com/virtualization/keeping-embedded-software-secure.php.

Day, Robert, "Hardware Virtualization Puts on a New Spin on Secure Systems", COTS Journal, http://www.lynuxworks.com/virtualization/virtualization-hardware.php, Oct. 2010, 6 pgs.

Delong et al. "Separation Kernel for a Secure Real-time Operating System," Jun. 2010, 5 pgs. http://web.archive.org/web/20100630223040/http://lynuxworks.com/products/whitepapers/separation-kenel.php.

Embedded computing design, "Advances in Virtualization Aid Information Assurance," Jan. 2008, pp. 1-8, http://embedded-computing.com/article-id/?2571.

Hoffman et al., "User Mode Versus Privileged Mode Processor Usage," Sep. 2010, pp. 1-2, http://blogs.technet.com/b/perfguide/archive/2010/09/28/user-mode-versus-privileged-mode-processor-usage-aspx.

Information from PCT patent application No. PCT/US2015/038918, filed Jul. 1, 2015; 52 pgs.

(56) References Cited

OTHER PUBLICATIONS

Iqbal et al., "An Overview of Microkernel, Hypervisor and Microvisor Virtualization Approaches for Embedded Systems," Dec. 2010, 15 pgs., http://proj.eit.lth.se/fileadmin/eit/project/142/virtApproaches.pdf.
International Preliminary Report on Patentability dated Dec. 31, 2014 (1 pg) and International Search Report and Written Opinion dated Feb. 27, 2014 (15 pgs) in related PCT application No. PCT/US2013/048014, Invitation to Pay Additional Fees in related PCT/US2013/48014, dated Jan. 3, 2014, (2 pgs.) 18 pgs. total.
International Search Report and Written Opinion for PCT/US15/31236 dated Aug. 14, 2015, 9 pgs.
International Search Report and Written Opinion for PCT/US15/31257 dated Aug. 17, 2015, 9 pgs.
Lynuxworks, "Secure Client Virtualization Based on Military-grade Technology," May 2011, pp. 1-8, http://web.archive.org/web/20110310051907/http://lynuxworks.com/virtualization/secure-client-virtualization/php.
Prosecution of EPO appln No. EP13809599.7, including International Preliminary Report on Patentability and Search Report, dated Dec. 1, 2015 (16 pgs), Communication dated Feb. 13, 2015 (3 pgs) and Amendment dated Aug. 24, 2015 (29 pgs); 48 pgs total.
Yoon et al., "An Intelligence Virtualization Rule Based on Multi-layer to Support social-Media Cloud Service", 2011, First ACIS/JNU International conference on computers, Networks, Systems, and Industrial Engineering, pp. 210-215.
Extended European Search Report of EP 13809599.7, dated Jun. 22, 2016, 10 pgs.
International Search Report for PCT/US2011/036553 dated Dec. 26, 2011, 4 pgs.
International Preliminary Report on Patentability for PCT/US2011/036553, dated Nov. 19, 2013 (1pg), including Written Opinion dated Dec. 26, 2011 (9 pgs), 10 pages total.
International Search Report and Written Opinion for PCT/US2012/177464 dated Dec. 27, 2012, 47 pages.
International Search Report and Written Opinion for PCT/US2015/031259, dated Oct. 7, 2015, 9 pgs.
International Preliminary Report on Patentability for PCT/US15/031257, dated Nov. 15, 2016, 6 pgs.
International Preliminary Report on Patentability for PCT/US15/031259, dated Nov. 15, 2016, 7 pgs.
International Preliminary Report on Patentability for PCT/US2015/031236 dated Nov. 15, 2016, 6 pgs.
International Preliminary Report on Patentability for PCT/US2015/038918 dated Jul. 1, 2015, 11 pgs.
Prosecution of European counterpart application No. 12802824.8 (EP2718785), including IPRP dated Dec. 17, 2013 (8pgs.), Response to Rule 161/162 Communication dated Sep. 3, 2014 (14 ogs.), Supplementary Search report and opinion dated Nov. 27, 2014 (10 pgs.), Response to Supplementary Search Report/Opinion dated Jun. 26, 2015 (23 pgs.), 2nd Supplemental Office Action dated Oct. 8, 2015 (6 pgs.), and Response to the 2nd Supplemental Office Action dated Apr. 12, 2016 (11 pgs.); 72 pages total.

* cited by examiner

SYSTEMS AND METHODS INVOLVING FEATURES OF HARDWARE VIRTUALIZATION, HYPERVISOR, APIS OF INTEREST, AND/OR OTHER FEATURES

CROSS-REFERENCE TO RELATED APPLICATION INFORMATION

This application is a continuation of U.S. patent application Ser. No. 14/714,233, filed May 15, 2015, now U.S. Pat. No. 9,213,840, which claims benefit/priority of U.S. provisional patent application No. 61/993,291, filed May 15, 2014, which are incorporated herein by reference in entirety.

BACKGROUND

Field

Innovations herein pertain to computer software and hardware, computer virtualization, computer security and/or data isolation, and/or the use of a separation kernel hypervisor (and/or hypervisor), such as to detect and/or process information, including notification(s) and other processing regarding code execution by guest software and which may include or involve guest operating system(s).

Description of Related Information

In computer systems with hypervisors supporting a guest operating system, there exist some means to monitor the guest operating system for malicious or errant activity.

In a virtualized environment, running under control of a hypervisor, a suitably authorized guest may be allowed to monitor the activities of another guest. Among the reasons for such monitoring are debugging and security. However, previous approaches may include various drawbacks, such as allowing guests to poll the memory and other information within the monitored guest.

However, due to the constantly evolving nature of malicious code, such systems face numerous limitations in their ability to detect and defeat malicious code. One major limitation is the inability of a hypervisor to defend itself against malicious code; e.g., the particular hypervisor may be subverted by malicious code and/or may allow malicious code in a guest operating system to proliferate between a plurality of guest operating systems in the system.

To solve that issue, the motivation and use of a Separation Kernel Hypervisor is introduced in environments with malicious code. The Separation Kernel Hypervisor, unlike a hypervisor, does not merely support a plurality of Virtual Machines (VMs), but supports more secure, more isolated mechanisms, including systems and mechanisms to monitor and defeat malicious code, where such mechanisms are isolated from the malicious code but are also have high temporal and spatial locality to the malicious code. For example, they are proximate to the malicious code, but incorruptible and unaffected by the malicious code.

Furthermore the Separation Kernel Hypervisor is designed and constructed from the ground-up, with security and isolation in mind, in order to provide security and certain isolation between a plurality of software entities (and their associated/assigned resources, e.g., devices, memory, etc.); by mechanisms which may include Guest Operating System Virtual Machine Protection Domains (secure entities established and maintained by a Separation Kernel Hypervisor to provide isolation in time and space between such entities, and subsets therein, which may include guest operating systems, virtualization assistance layers and detection mechanisms); where such software entities (and their associated assigned resources, e.g., devices, memory, etc., are themselves isolated and protected from each other by the Separation Kernel Hypervisor, and/or its use of hardware platform virtualization mechanisms.

Additionally, where some hypervisors may provide mechanisms to communicate between the hypervisor and antivirus software, or monitoring agent, executing within a guest operating system, the hypervisor is not able to prevent corruption of the monitoring agent where the agent is within the same guest operating system; or the guest operating system (or any subset thereof, possibly including the antivirus software, and/or monitoring agent) may be corrupted and/or subverted.

Finally, while some known systems and methods include implementations involving virtualized assistance layers and separation kernel hypervisors to handle various malicious code intrusions, however the present disclosure is directed to innovations for handling and/or intercepting various certain specified attacks, such as those related to APIs of interest.

OVERVIEW OF SOME ASPECTS

Systems, methods, computer readable media and articles of manufacture consistent with innovations herein are directed to computer virtualization, computer security and/or data isolation, and/or the use of a Separation Kernel Hypervisor (and/or hypervisor), such as to detect, process information and/or provide notification regarding code execution associated with specified interfaces or memory locations, such as Application Program Interfaces (APIs) of interest, by guest software and which may include or involve guest operating system(s). Information may further be obtained regarding the context of such code execution. Here, for example, certain implementations may include a suitably authorized guest running under control of a hypervisor and involving features of being immediately notified of another guest executing code at specified physical memory location(s) or involving specified interfaces. Upon access, the monitoring guest may be provided with execution context information from the monitored guest.

According to some illustrative implementations, innovations herein may utilize and/or involve a separation kernel hypervisor which may include the use of a guest operating system virtual machine protection domain, a virtualization assistance layer, and/or a code execution detection mechanism (which may be proximate in temporal and/or spatial locality to subject code, but isolated from it). Such implementations may be utilized, inter alia, for detection and/or notification of code execution by guest software involving specified memory locations or interfaces, such as APIs of interest. In some implementations, for example, a suitably authorized guest may obtain immediate notification if another guest it is monitoring executes code calling, involving or otherwise associated with the specified locations or interfaces. Upon such access, the monitoring guest may be provided with execution context information from the monitored guest. Further, the monitored guest may be paused until the monitoring guest provides a new execution context to the monitored guest, whereupon the monitored guest resumes execution with the new context.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and features of the present innovations and, together with the description, explain aspects of the inventions herein. In the drawings.

DETAILED DESCRIPTION OF ILLUSTRATIVE IMPLEMENTATIONS

Figure 1:
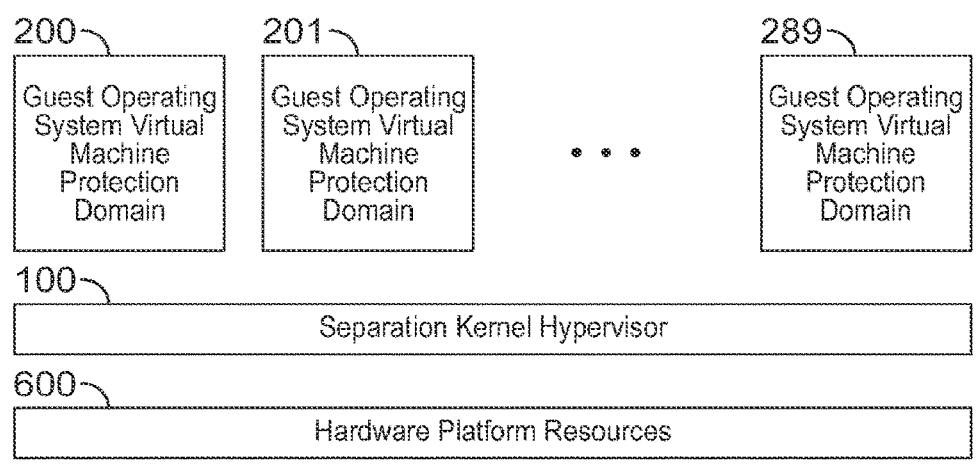
FIG. 1 is a block diagram illustrating an exemplary system and separation kernel hypervisor architecture consistent with certain aspects related to the innovations herein.

Reference will now be made in detail to the inventions herein, examples of which are illustrated in the accompanying drawings. The implementations set forth in the following description do not represent all implementations consistent with the inventions herein. Instead, they are merely some examples consistent with certain aspects related to the present innovations. Wherever possible, the same reference numbers are used throughout the drawings to refer to the same or like parts.

To solve one or more of the drawbacks mentioned above and/or other issues, implementations herein may relate to various detection, monitoring, notification(s), interception and/or prevention techniques, systems, and mechanisms, as may be used with a separation kernel hypervisor. Among other things, such systems and methods may include and/or involve the use of the monitoring of the entirety, or suitably configured subset thereof of guest operating system resources including virtualized resources, and/or "physical" or "pass-through" resources. Examples include monitoring of the virtual CPUs, its memory access attempts to execute code at specified memory or involving specified interfaces, such as monitoring APIs of interest.

With regard to certain implementations, in order to perform such advanced monitoring in a manner that maintains suitable performance characteristics in a system that may include a separation kernel hypervisor and a guest operating system, mechanisms such as a separation kernel hypervisor, a guest operating system virtual machine protection domain, virtual machine assistance layer, and/or code execution detection mechanisms, may be used to monitor a monitored guest on a corresponding guest operating system.

Systems and methods are disclosed for detecting and/or notifying executed code by guest software and which may include or involve guest operating system(s). According to some implementations, for example, a suitably authorized guest running under control of a hypervisor may request that it be notified of another guest executing code at a specified physical memory location. Features of real-time notification of, and action(s) regarding obtaining an execution context are provided to the monitoring guest upon access by the monitored guest to executed code at specific physical memory locations. Here, monitoring may also be performed in a timely and expeditious fashion, including by virtue of the monitoring context being proximate (in time and space) to the monitored context. Additionally, isolation may be maintained between the monitor and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

According to some implementations, for example, a hypervisor is configured to allow a guest (monitoring guest) to request notifications of code execution by another guest (monitored guest). The monitoring guest requests that a set of physical memory locations be monitored for code execution, and the execution context data be returned on such access. The Virtualization Assistance Layer (VAL) in the Monitored Guest maps (e.g., remaps, unmaps) those physical APIs containing those locations as non-executable. This is distinct from the Monitored Guest's notion of API mappings. When software in the Monitored Guest attempts to execute code in such an API, control transitions to the VAL. The VAL determines that the address being executed is part of the set to be monitored. The VAL notifies the monitoring guest of the access and provides the monitoring guest with the execution context data as configured for that access. The Monitored Guest is allowed to continue operation as though the API has always been mapped executable.

According to some implementations, for example, a Separation Kernel Hypervisor (SKH) ensures the isolation of multiple guest Operating Systems each in its own Virtual Machine (VM). The SKH may implement a mechanism whereby a suitably authorized Monitoring Guest sends a list of memory locations to be monitored for another guest.

Furthermore, each of the physical memory locations may be associated with a specification for the execution context information to be obtained upon access to the memory location(s). The SKH may send to the other guests the specification for the execution context information associated with the list of memory locations. A Virtualization Assistance Layer of software runs within the same protection domain as the guest Virtual Machine but is not directly accessible by the guest. A Virtualization Assistance Layer implements a virtual motherboard containing a virtual CPU and memory. The VAL and mechanism may process exceptions caused by non-executable API execution attempts by its associated guest virtual machine. The VAL may determine whether the memory address accessed is one of those specified in the list of physical memory locations sent to another guest. The VAL may send a notification of the memory access and associated context information to the requesting guest.

Systems and methods are disclosed for providing secure information monitoring. According to some implementations, for example, such information monitoring may be provided from a context not able to be bypassed, tampered with or by the context under monitoring. Here, monitoring may also be performed in a timely and expeditious fashion, including by virtue of the monitoring context being proximate (in time and space) to the monitored context. Additionally, isolation may be maintained between the monitor and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

In one exemplary implementation, there is provided a method of secure domain isolation, whereby an execution context within a virtual machine may monitor another execution context within that virtual machine or another virtual machine, in a manner maintaining security and isolation between such contexts. Innovations herein also relate to provision of these contexts such that neither/none can necessarily corrupt, affect, and/or detect the other.

Moreover, systems and methods herein may include and/or involve a virtual machine which is augmented to form a more secure virtual representation of the native hardware platform for a particular execution context. And such implementations may also include a virtual representation which is augmented with a wide and deep variety of built-in detection, notification(s) and monitoring mechanisms, wherein secure isolation between the domains or virtual machines is maintained.

In general, aspects of the present innovations may include, relate to, and/or involve one or more of the following aspects, features and/or functionality. Systems and methods herein may include or involve a separation kernel hypervisor. According to some implementations, a software entity in hypervisor context that partitions the native hardware platform resources, in time and space, in an isolated and secure fashion may be utilized. Here, for example, embodiments may be configured for partitioning/isolation as between a plurality of guest operating system virtual machine protection domains (e.g., entities in a hypervisor guest context).

The separation kernel hypervisor may host a plurality of guest operating system virtual machine protection domains and may host a plurality of mechanisms including detection mechanisms which may execute within such guest operating system virtual machine protection domains. The detection mechanisms may execute in an environment where guest operating systems cannot tamper with, bypass, or corrupt the detection mechanisms. The detection mechanisms may also execute to increase temporal and spatial locality of the guest operating system's resources. Further, in some implementations, the detection mechanisms may execute in a manner that is not interfered with, nor able to be interfered with, nor corrupted by other guest operating system virtual machine protection domains including their corresponding guest operating systems. The detection mechanisms include, but are not limited to, performing one or more of the following actions on guest operating systems related to guest code execution at specified memory location(s), such as access to APIs of interest including sensitive memory regions, and/or actions in response thereto.

Where monitoring may include, but is not limited to, actions pertaining to observation, detection, mitigation, prevention, tracking, modification, reporting upon, of memory access within and/or by a guest operating system and/or by entities configured to perform such monitoring for purposes which may be used to ascertain, and assist in ascertaining, when suspect code, and/or code under general monitoring or instrumented execution/debugging, unit test, regression test, or similar scrutiny, is or may be operating at specified memory location(s); or, therein, hiding and/or concealed, halted, stalled, infinitely looping, making no progress beyond its intended execution, stored and/or present (either operating or not), once-active (e.g., extinct/not present, but having performed suspect and/or malicious action), and otherwise having been or being in a position to adversely and/or maliciously affect the hypervisor guest, or resource under control of the hypervisor guest.

The term "map" or "mapped" shall broadly mean: setting a memory page with any of the following properties applied to it (as set and enforced by the hardware MMU via the SKH): mapped (present), executable, readable, writeable.

The term "unmap" or "unmapped" shall broadly mean: setting a memory page with any of the following properties applied to it (as set and enforced by the hardware MMU via the SKH): unmapped (non-present), non-executable, non-readable, non-writeable.

FIG. 1 is a block diagram illustrating an exemplary system and separation kernel hypervisor architecture consistent with certain aspects related to the innovations herein. FIG. 1 also shows a separation kernel hypervisor executing on native hardware platform resources, e.g., where the separation kernel hypervisor may support the execution, isolated and partitioned in time and space, between a plurality of guest operating system protection domains. Here, a guest operating system domain may be an entity that is established and maintained by the separation kernel hypervisor in order to provide a secure and isolated execution environment for software. Referring to FIG. 1, a separation kernel hypervisor 100 is shown executing on top of the native hardware platform resources 600. Further, the separation kernel hypervisor 100 supports the execution of a guest operating system virtual machine protection domain 200.

The separation kernel hypervisor 100 may also support the execution of a plurality of guest operating system virtual machine protection domains, e.g., 200 to 299 in FIG. 1. In some implementations, the separation kernel hypervisor may provide time and space partitioning in a secure and isolated manner for a plurality of guest operating system virtual machine protection domains, e.g., 200 to 299 in FIG. 1. Such features may include rigid guarantees on scheduling resources, execution time, latency requirements, and/or resource access quotas for such domains.

According to some implementations, in terms of the sequence of establishment, after the native hardware platform resources 600 boot the system, execution is transitioned to the separation kernel hypervisor 100. The separation kernel hypervisor 100 then creates and executes a guest operating system virtual machine protection domain 200, or a plurality of guest operating system virtual machine protection domains, e.g., 200 to 299 in FIG. 1. Some implementations of doing so consonant with aspects related to implementations herein are set forth in PCT Application No. PCT/2012/042330, filed 13 Jun. 2012, published as WO2012/177464A1, and U.S. patent application Ser. No. 13/576,155, filed Dec. 12, 2013, published as US2014/0208442 A1, which are incorporated herein by reference in entirety.

Consistent with aspects of the present implementations, it is within a guest operating system virtual machine protection domain that a guest operating system may execute. Further, it is within a guest operating system virtual machine protection domain that code execution detection mechanisms may also execute, e.g., in a fashion isolated from any guest operating system which may also execute within that same guest operating system virtual machine protection domain, or in other guest operating system virtual machine protection domains.

Figure 2A:
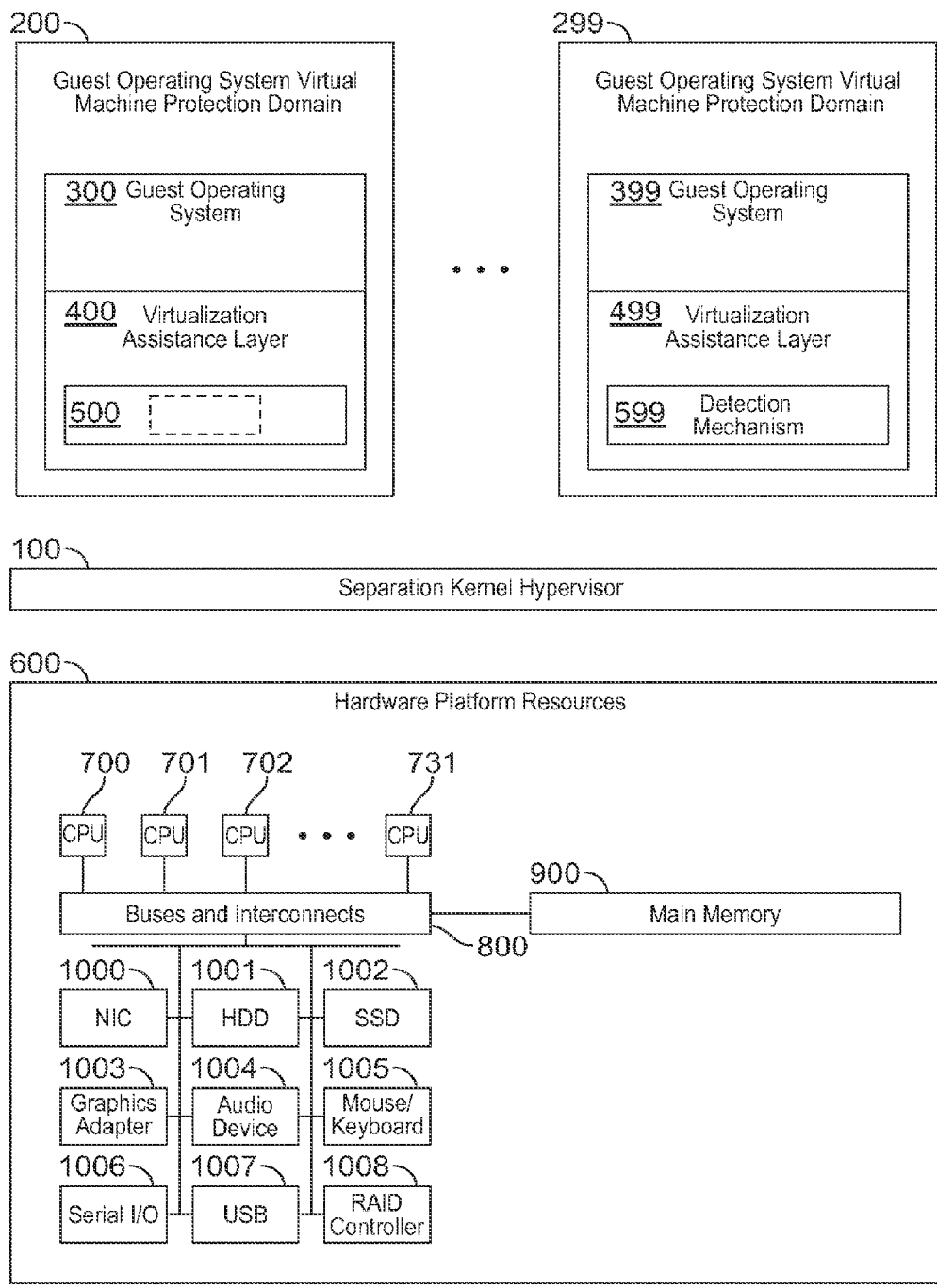
FIG. 2A is a block diagram illustrating an exemplary system and separation kernel hypervisor architecture consistent with certain aspects related to the innovations herein.

FIG. 2A is a block diagram illustrating an exemplary system and separation kernel hypervisor architecture consistent with certain aspects related to the innovations herein. FIG. 2A also shows a separation kernel hypervisor executing on native hardware platform resources (where the native platform resources may include a plurality of CPUs, buses and interconnects, main memory, Network Interface Cards (NIC), Hard Disk Drives (HDD), Solid State Drives (SSD), Graphics Adaptors, Audio Devices, Mouse/Keyboard/Pointing Devices, Serial I/O, USB, and/or Raid Controllers, etc.), where the separation kernel hypervisor may support the execution, isolated and/or partitioning in time and space, between a plurality of guest operating system protection domains. Here, some implementations may involve a guest operating system protection domains which may contain a guest operating system, and/or a virtualization assistance layer (which itself may contain code execution detection mechanisms).

FIG. 2A shows both a guest operating system 300, and a virtualization assistance layer 400 executing within the same guest operating system virtual machine protection domain 200. In some implementations, the virtualization assistance layer 400 may provide the execution environment for the code execution detection mechanism(s) 500. Further, the virtualization assistance layer 400 may assist the separation kernel hypervisor in virtualizing portions of the platform resources exported to a given guest operating system (e.g., Virtual CPU/ABI, Virtual chipset ABI, set of virtual devices, set of physical devices, and/or firmware, etc., assigned to a given guest operating system 300 and/or guest virtual machine protection domain 200). Some systems and methods herein utilizing such virtualization assistance layer may include or involve (but are not strictly limited to) a self-assisted virtualization component, e.g., with an illustrative implementation shown in FIG. 2D.

The guest operating system 300 and the virtualization assistance layer 400 (which may include code execution detection mechanism(s) 500) are isolated from each other by the separation kernel hypervisor 100. In implementations herein, the guest operating system 300 cannot tamper with, bypass, or corrupt the virtualization assistance layer 400, nor can it tamper with, bypass or corrupt the code execution detection mechanisms 500. Since the code execution detection mechanisms 500 are isolated from the guest operating system 300, the code execution detection mechanisms 500 are able to act on a portion of (or the entirety, depending on policy and configuration) of the guest operating system 300 and its assigned resources in a manner that is (a) is transparent to the guest operating system 300 and (b) not able to be tampered with by the guest operating system 300 or its assigned resources (e.g., errant and/or malicious device DMA originated by devices assigned to the guest operating system 300), and (c) not able to be bypassed by the guest operating system 300. For example, the code execution detection mechanisms 500, within the given virtualization assistance layer 400, may read and/or modify portions of the guest operating system 300 and resources to which the Guest Operating System 300 has been granted access (by the Separation Kernel Hypervisor 100), while none of the Guest Operating System 300 nor the resources to which has access may modify any portion of the code execution detection mechanisms 500 and/or virtualization assistance layer 400.

By having a given virtualization assistance layer 400 and a given Guest Operating System 300 within the within the same Guest Virtual Machine Protection Domain 200, isolated from each other by the Separation Kernel Hypervisor 100, various benefits, non-penalties, or mitigation of penalties, such as the following, may be conferred to the system at large and to the code execution detection mechanisms 500:

Increased Spatial and Temporal Locality of Data

By being contained within the same Guest Virtual Machine Protection Domain 300, the virtualization assistance layer 200, and/or corresponding private (local) code execution detection mechanisms 500 existing in that same Guest Virtual Machine Protection Domain 300, have greater access, such as in time and space, to the resources of the Guest Operating System 300 than would entities in other guest virtual machine protection domains or other Guest Operating Systems; e.g., the subject guest virtual machine protection domain has faster responsiveness and/or has lower latency than if processed in another guest virtual machine protection domain. Though such resources are still accessed in a manner that is ultimately constrained by the Separation Kernel Hypervisor 100, there is less indirection and time/latency consumed in accessing the resources:

In one illustrative case, the code execution detection mechanisms 500 private (local) to a given Guest virtualization assistance layer 200 and its associated Guest Operating System 300 can react faster to code execution physical memory access issues, and not need to wait on actions from another entity in another guest virtual machine protection domain 200 or guest operating system 300 (which may themselves have high latency, be corrupted, unavailable, poorly scheduled, or subject to a lack of determinism and/or resource constraint, or improper policy configuration, etc.).

Here, for example, if a Guest Operating System 300 was to monitor a Guest Operating System 399 located within another Guest Virtual Machine Protection Domain 107, it would encounter penalties in time and space for accessing that Guest Operating System and its resources; furthermore, there is increased code, data, scheduling, and/or security policy complexity to establish and maintain such a more complex system; such increases in complexity and resources allow for more bugs in the implementation, configuration, and/or security policy establishment and maintenance.

Scalability and Parallelism

Each Guest Operating System 300 may have a virtualization assistance layer 200, and code execution detection mechanisms 500, that are private (local) to the Guest Virtual Machine Protection Domain 200 that contains both that Guest Operating System 300, the virtualization assistance layer 400, and the code execution detection mechanisms.

Fault Isolation, Low Level of Privilege, Defense in Depth, Locality of Security Policy, and Constraint of Resource Access Here, for example, relative to the extremely high level of privilege of the separation kernel hypervisor 100, the virtualization assistance layer 400, the code execution detection mechanism 500, and the Guest Operating System 300 within the same Guest Virtual Machine Protection Domain 200 are only able to act on portions of that Guest Virtual Machine Protection Domain 200 (subject to the Separation Kernel Hypervisor 100) and not portions of other Guest Virtual Machine Protection Domains (nor their contained or assigned resources).

Subject to the isolation guarantees provided by the Separation Kernel Hypervisor 100, the virtualization assistance layer 400 accesses only the resources of the Guest Operating System 300 within the same Guest Virtual Machine Protection Domain 200 and that virtualization assistance layer 400 is not able to access the resources of other Guest Operating Systems.

As such, if there is corruption (bugs, programmatic errors, malicious code, code and/or data corruption, or other faults, etc.) within a given Guest Virtual Machine Protection Domain 200 they are isolated to that Guest Virtual Machine Protection Domain 200. They do not affect other Guest Virtual Machine Protection Domains 299 nor do they affect the Separation Kernel Hypervisor 100. This allows the Separation Kernel Hypervisor to act upon (e.g., instantiate, maintain, monitor, create/destroy, suspend, restart, refresh, backup/restore, patch/fix, import/export etc.) a plurality of Guest Virtual Machine Protection Domains 200 and their corresponding virtualization assistance layer 400 and code execution detection mechanisms 500 (or even Guest Operating Systems 300) without corruption of the most privileged execution context of the system, the Separation Kernel Hypervisor 100.

Similarly, the faults that may occur within a virtualization assistance layer 400 or the code execution detection mechanisms 500 (e.g., by corruption of software during delivery) are contained to the Guest Virtual Machine Protection Domain 200 and do not corrupt any other Guest Virtual Machine Protection Domain; nor do they corrupt the Separation Kernel Hypervisor 100.

Furthermore, the faults within a Guest Operating System 300 are contained to that Guest Operating System 300, and do not corrupt either the virtualization assistance layer 400 or the code execution detection mechanisms 500.

Figure 2B:
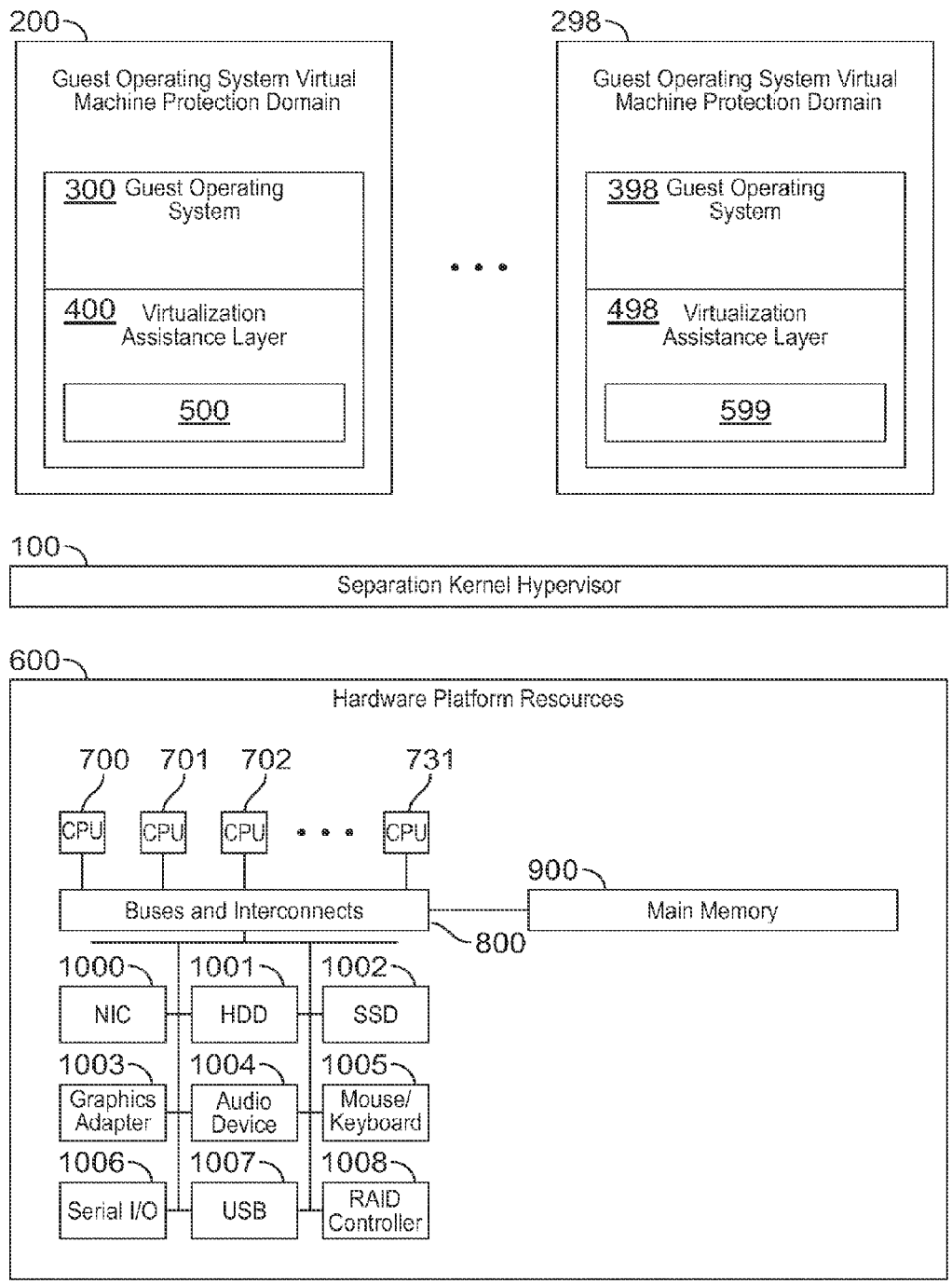
FIG. 2B is a block diagram illustrating an exemplary system and separation kernel hypervisor architecture consistent with certain aspects related to the innovations herein.

FIG. 2B is a block diagram illustrating an exemplary system and separation kernel hypervisor architecture consistent with certain aspects related to the innovations herein. FIG. 2B illustrates a variation of FIG. 2A where a minimal runtime environment 398 executes in place of a (larger/more complex) guest operating system. Here, a minimal runtime environment may be an environment such as a VDS (virtual device server), and/or a LSA (LynxSecure application), etc. The minimal runtime environment 398 can be used for policy enforcement related to activities reported by a virtualization assistance layer and/or code execution detection mechanisms; such an environment is also monitored by a virtualization assistance layer and/or code execution detection mechanisms private to the guest operating system virtual machine protection domain containing the minimal runtime environment.

Figure 2C:
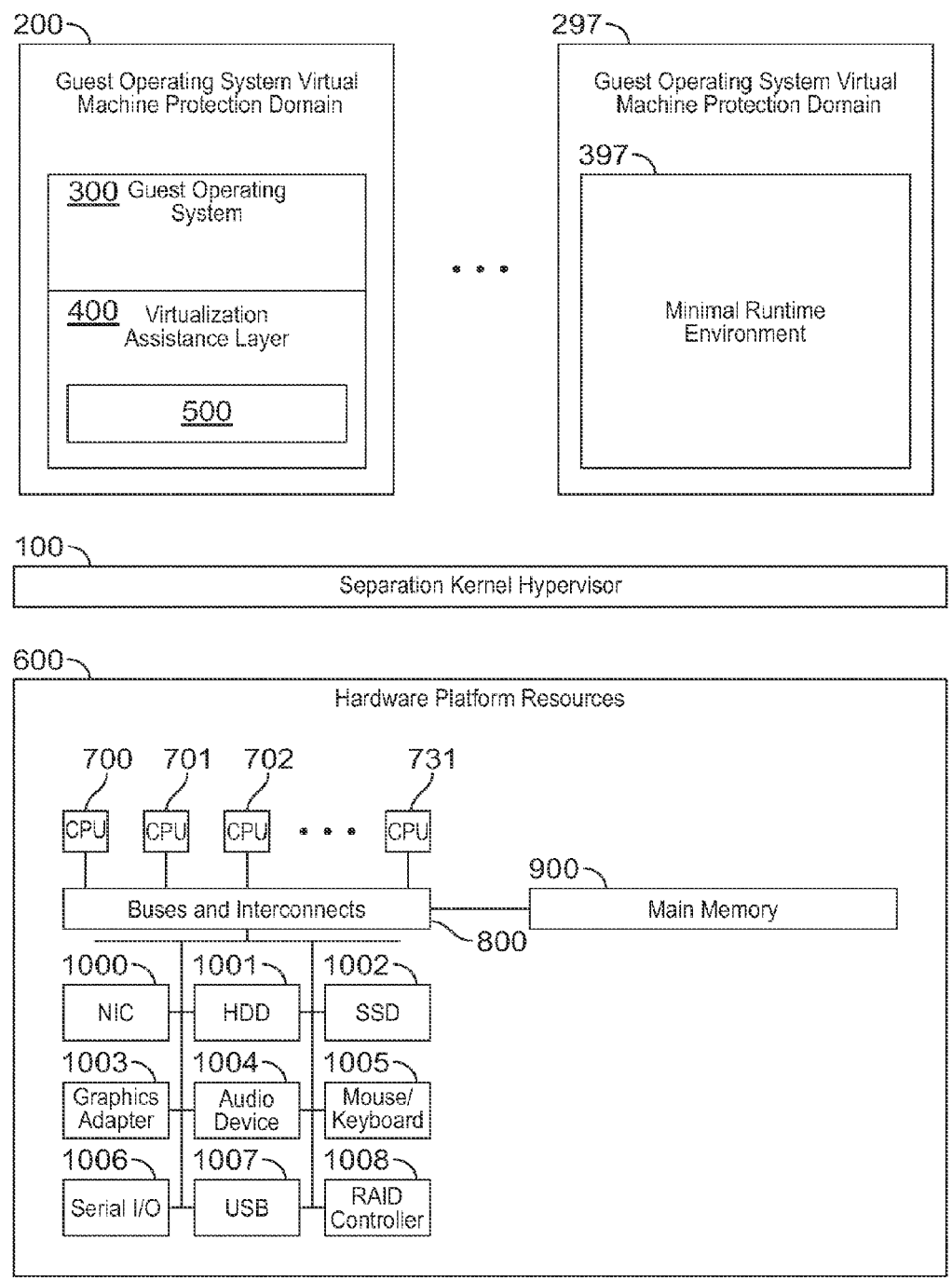
FIG. 2C is a block diagram illustrating an exemplary system and separation kernel hypervisor architecture consistent with certain aspects related to the innovations herein.

FIG. 2C is a block diagram illustrating an exemplary system and separation kernel hypervisor architecture consistent with certain aspects related to the innovations herein. FIG. 2C illustrates a variation of FIG. 2A and FIG. 2B where a minimal runtime environment executes in place of a (larger/more complex) guest operating system but without a virtualization assistance layer or code execution detection mechanisms.

Figure 2D:
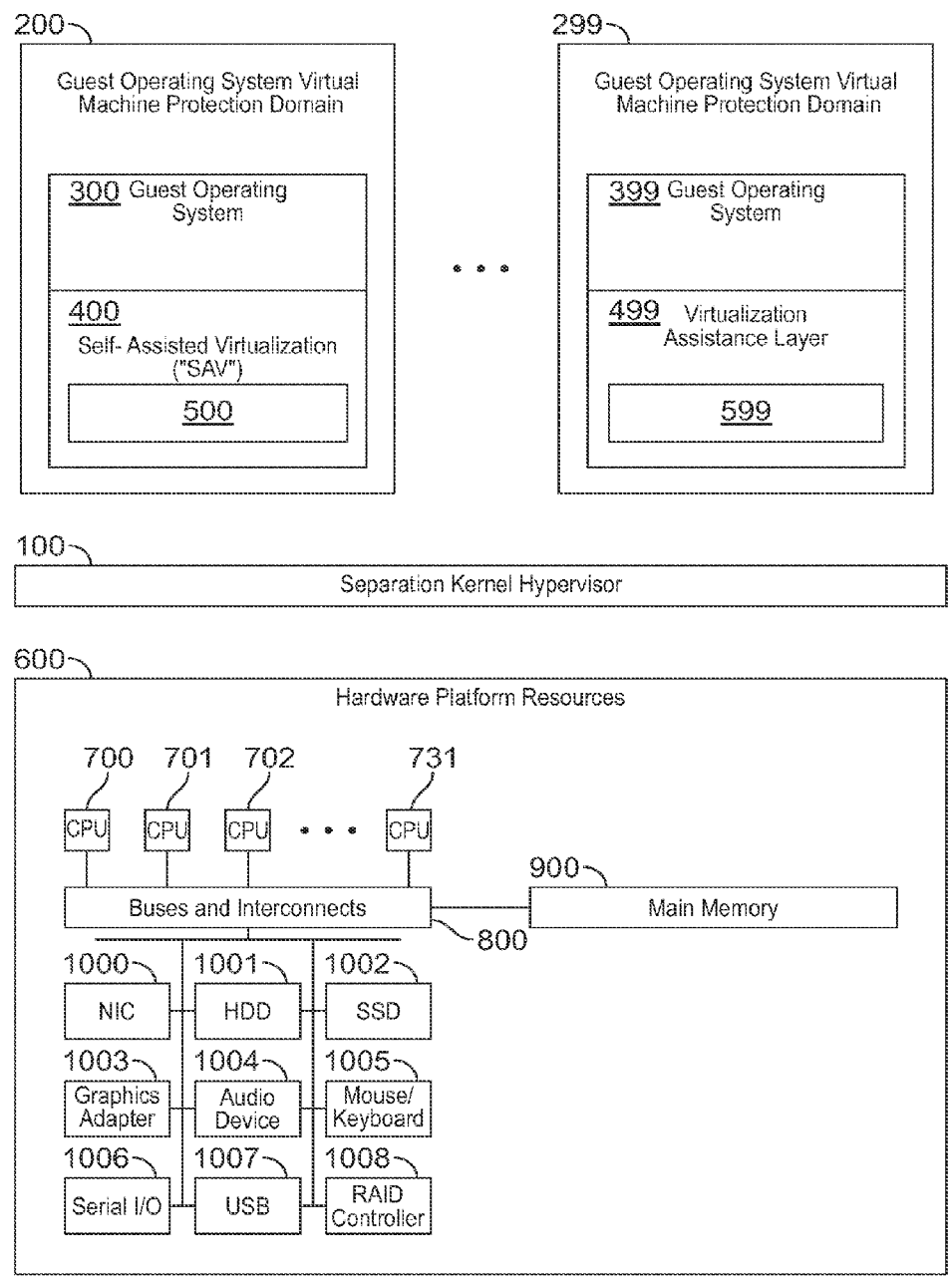
FIG. 2D is a block diagram illustrating an exemplary system and separation kernel hypervisor architecture consistent with certain aspects related to the innovations herein.

FIG. 2D is a block diagram illustrating an exemplary system and Separation Kernel Hypervisor architecture consistent with certain aspects related to the innovations herein. FIG. 2D illustrates a variation of FIG. 2 where a Self-Assisted Virtualization (SAV) mechanism is used to implement the virtualization assistance layer.

Figure 3:
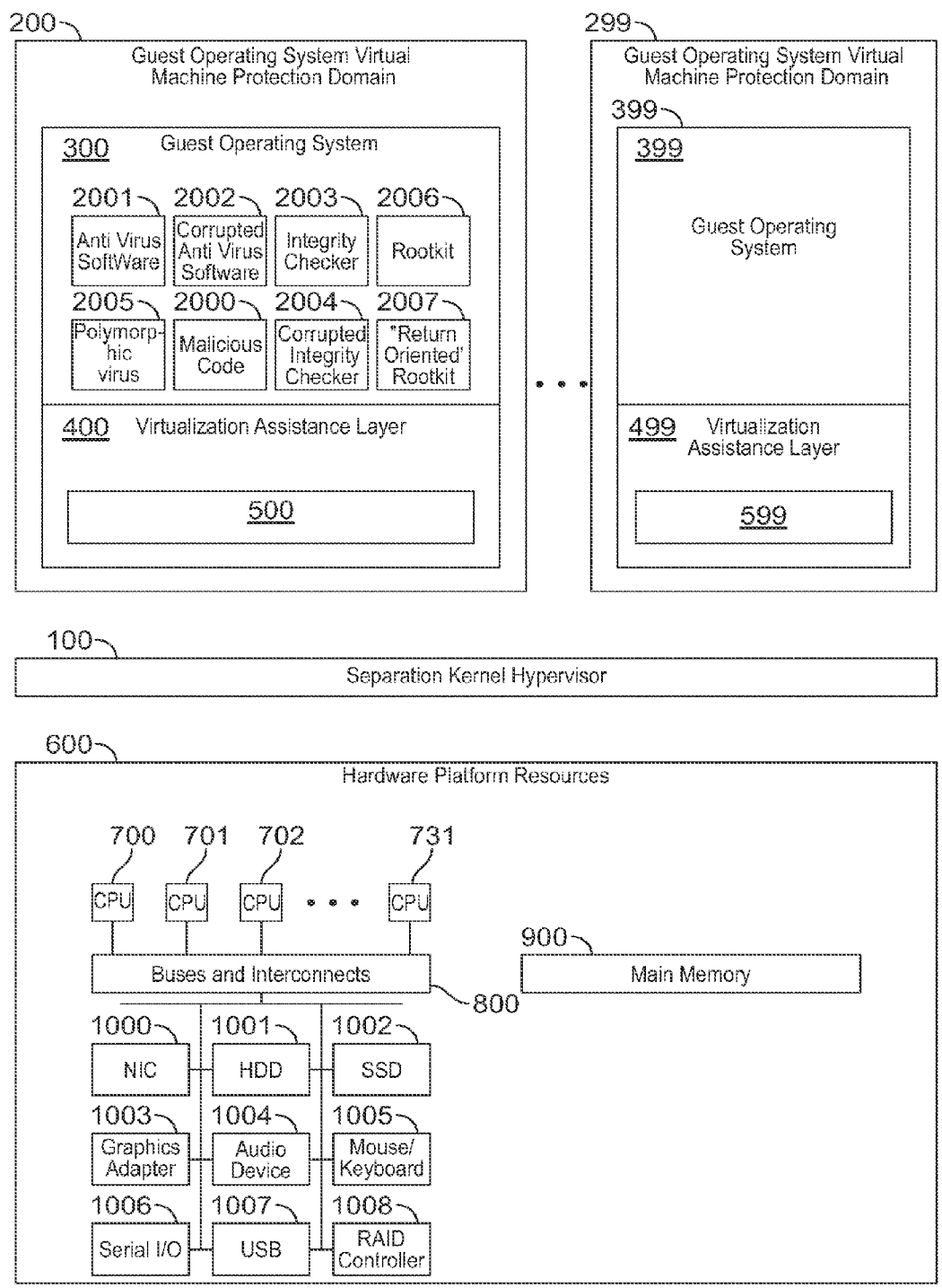
FIG. 3 is a block diagram illustrating an exemplary system and separation kernel hypervisor architecture consistent with certain aspects related to the innovations herein.

FIG. 3 is a block diagram illustrating an exemplary system and separation kernel Hypervisor architecture consistent with certain aspects related to the innovations herein. FIG. 3 also shows certain detailed aspects with respect to FIGS. 2A/B, where the guest operating system may attempt to access APIs of interest at specified memory locations that may include a plurality of code and/or data which may constitute execution contexts which may include the following types of software including any/all of which malicious code may attempt to corrupt or utilize: malicious code, anti-virus software, corrupted anti-virus software, integrity checkers, corrupted integrity checkers, rootkits, return oriented rootkits, etc. The inventions herein are not limited to memory access attempts to malicious code and is discussed below as illustrative examples.

For example, in FIG. 3, if antivirus software 2001 executes within a given guest operating system 300, and such anti-virus software 2001 is itself corrupted, and itself executes malicious code 2002 or fails to prevent the execution of malicious code 2002, the corruption is constrained to the given guest operating system 300, and the corruption may be acted upon (e.g., detected, notified, prevented, mitigated, reported, tracked, modified/patched, suspended, halted, restarted, eradicated, etc.) by the code execution detection mechanisms 500 that monitors/acts on code execution in specified memory location(s) such as APIs of interest, and is provided within the same guest virtual machine protection domain 200 as the guest operating system 300.

With regard to other exemplary implementations, as may be appreciated in connection with FIG. 3, if an integrity checker 2003 (e.g., a "security" component or driver within a guest operating system 300) executes within a given guest operating system 300, and such integrity checker 2003 is itself corrupted into a corrupted integrity checker 2004 (and executes malicious code, or fails to prevent the execution of malicious code), the corruption is constrained to the given guest operating system 300, and the corruption may be acted upon (e.g., detected, notified, prevented, mitigated, reported, tracked, modified/patched, suspended, halted, restarted, eradicated, etc.) by the code execution detection mechanisms 500 that monitors/acts on code executed at the specified memory location(s), and is provided within the same guest virtual machine protection domain 200 as the guest operating system 300.

With regard to another illustration, again with reference to FIG. 3, if a rootkit 2006 executes within the guest operating system 300 (e.g., by having fooled the Integrity Checker 2003 by the nature of the root kit being a return oriented rootkit 2007, which are designed specifically to defeat integrity checkers) the corruption is constrained to the given guest operating system 300, and the corruption may be acted upon (e.g., detected, notified, prevented, mitigated, reported, tracked, modified/patched, suspended, halted, restarted, eradicated, etc.) by the code execution detection mechanisms 500 that monitors/acts on code execution in specified memory location(s), and is provided within the same guest virtual machine protection domain 200 as the guest operating system 300.

In another example, again with respect to FIG. 3, if a polymorphic virus 2005 (an entity designed to defeat integrity checkers, among other things) executes within the guest operating system 300 (e.g., by having fooled the integrity checker 2003, or by having the a corrupted integrity checker 2003) the corruption is constrained to the given guest operating system 300, and the corruption may be acted upon (e.g., detected, notified, prevented, mitigated, reported, tracked, modified/patched, suspended, halted, restarted, eradicated, etc.) by the code execution detection mechanisms 500 that monitors/acts on code execution in specified memory location(s), and is provided within the same guest virtual machine protection domain 200 as the guest operating system 300.

In general, referring to FIG. 3, if a malicious code 2000 executes within the guest operating system 300 (e.g., by means including, but not limited strictly to bugs, defects, bad patches, code and/or data corruption, failed integrity checkers, poor security policy, root kits, viruses, trojans, polymorphic viruses, and/or other attack vectors and/or sources of instability within the guest operating system 300 etc.), the corruption is constrained to the given guest operating system 300, and the corruption may be acted upon (e.g., detected, notified, prevented, mitigated, reported, tracked, modified/patched, suspended, halted, restarted, eradicated, etc.) by the code execution detection mechanisms 500 that monitors/acts on code execution in specified memory location(s), and is provided within the same guest virtual machine protection domain 200 as the guest operating system 300.

Furthermore, in the examples above and other cases, such corruption of the guest operating system 300, and the resources to which it has access, do not corrupt the code execution detection mechanisms 500, the virtualization assistance layer 400, the guest virtual machine protection domain 200, or plurality of other such resources in the system (e.g., other guest virtual machine protection domains 299), or the separation kernel hypervisor 100.

In some implementations, the code execution detection mechanisms 500, in conjunction with the virtualization assistance layer 400, and the separation kernel hypervisor 100, may utilize various methods and mechanisms such as the following, given by way of illustration and example but not limitation, to act with and upon its associated guest operating system 300 the resources assigned to the guest operating system 300, and the systems behavior generated thereto and/or thereby.

Figure 4:
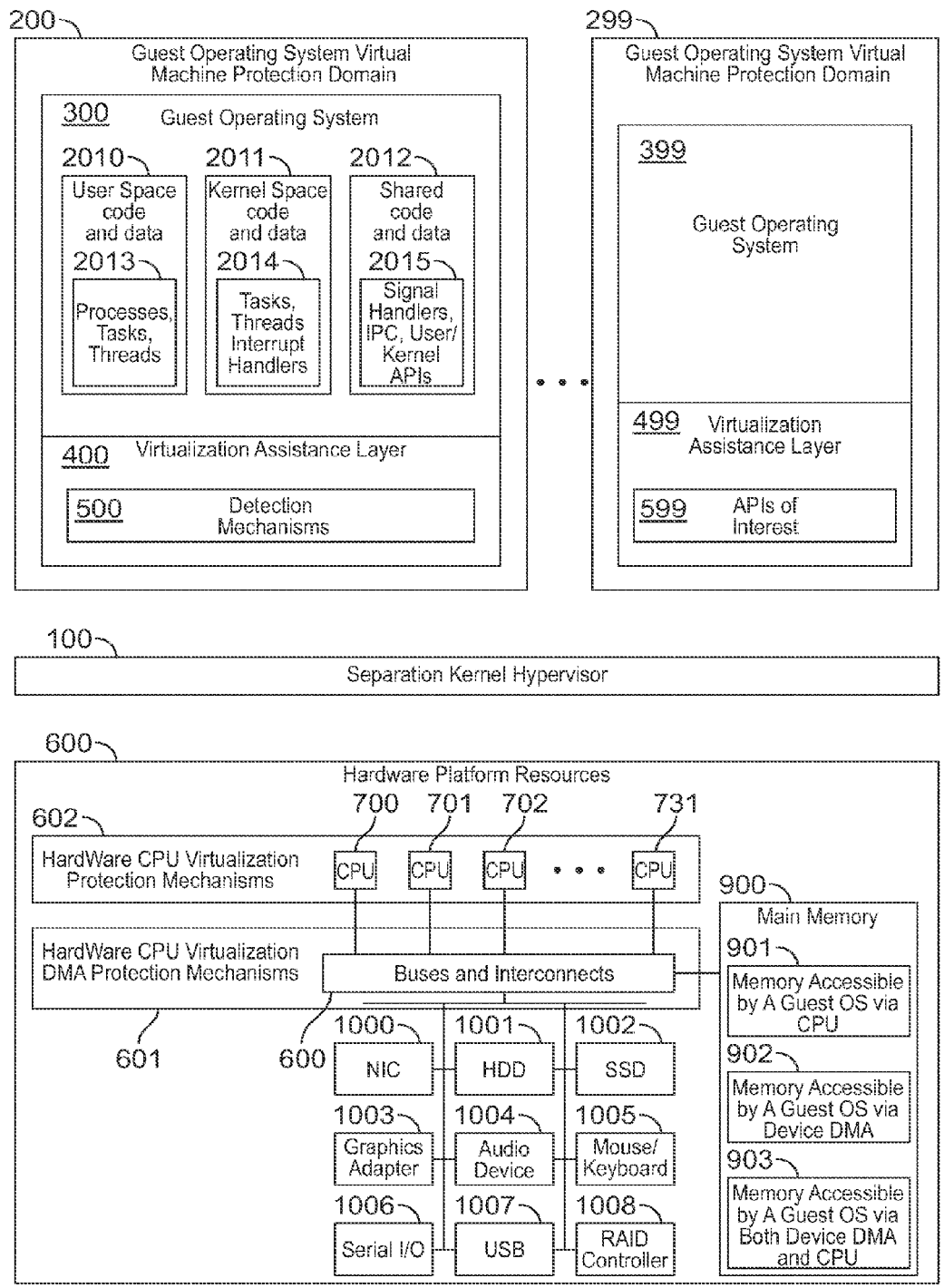
FIG. 4 is a block diagram illustrating an exemplary system and separation kernel hypervisor architecture consistent with certain aspects related to the innovations herein.

FIG. 4 is a block diagram illustrating an exemplary system and separation kernel hypervisor architecture consistent with certain aspects related to the innovations herein. For example, FIG. 4 illustrates resources that may be assigned to a Guest Operating System 300 consistent with certain aspects related to the innovations herein.

FIG. 4 shows an illustrative extension of either FIG. 2, and/or FIG. 3, where the guest operating system may have a plurality of code and/or data which may constitute execution contexts which may include the following types of software mechanisms and/or constructs user space code and data that may be associated with an unprivileged mode of CPU code execution (as used herein 'user space' being an execution environment of low privilege, versus an execution environment of high privilege, such as kernel space), which may contain processes, tasks, and/or threads, etc.; kernel space code and data, that may be associated with a privileged mode of CPU execution, which may contain tasks, threads, interrupt handlers, drivers, etc.; shared code and data, that may be associated with either privileged and/or unprivileged modes of CPU execution, and which may include signal handlers, Inter Process Communication Mechanisms (IPC), and/or user/kernel mode APIs. It also may include main memory that may be accessed by the CPU, by DMA from devices, or both. It also shows protection mechanisms including hardware CPU virtualization protection mechanisms, and hardware virtualization DMA protection mechanisms. Code execution detection mechanisms 500, 599 such as APIs of interest mechanisms may reside within corresponding Virtualization Assistance Layers 400, 499

Such resources, explained here by way of example, not limitation, may include a subset of (a) hardware platform resources 600, virtualized hardware platform resources (hardware platform resources 600 subject to further constraint by the separation kernel hypervisor 100, the hardware CPU virtualization protection mechanisms 602, and/or the hardware virtualization DMA protection mechanisms 601), and execution time on a CPU 700 (or a plurality of CPUs, e.g., 700 to 731) (scheduling time provided by the separation kernel hypervisor 100), and space (memory 900 provided by the separation kernel hypervisor) within which the guest operating system 300 may instantiate and utilize constructs of the particular guest operating system 300, such as a privileged ("kernel" space) modes of execution, non-privileged ("user" space) modes of execution, code and data for each such mode of execution (e.g., processes, tasks, threads, interrupt handlers, drivers, signal handlers, inter process communication mechanisms, shared memory, shared APIs between such entities/contexts/modes, etc.

Figure 5:
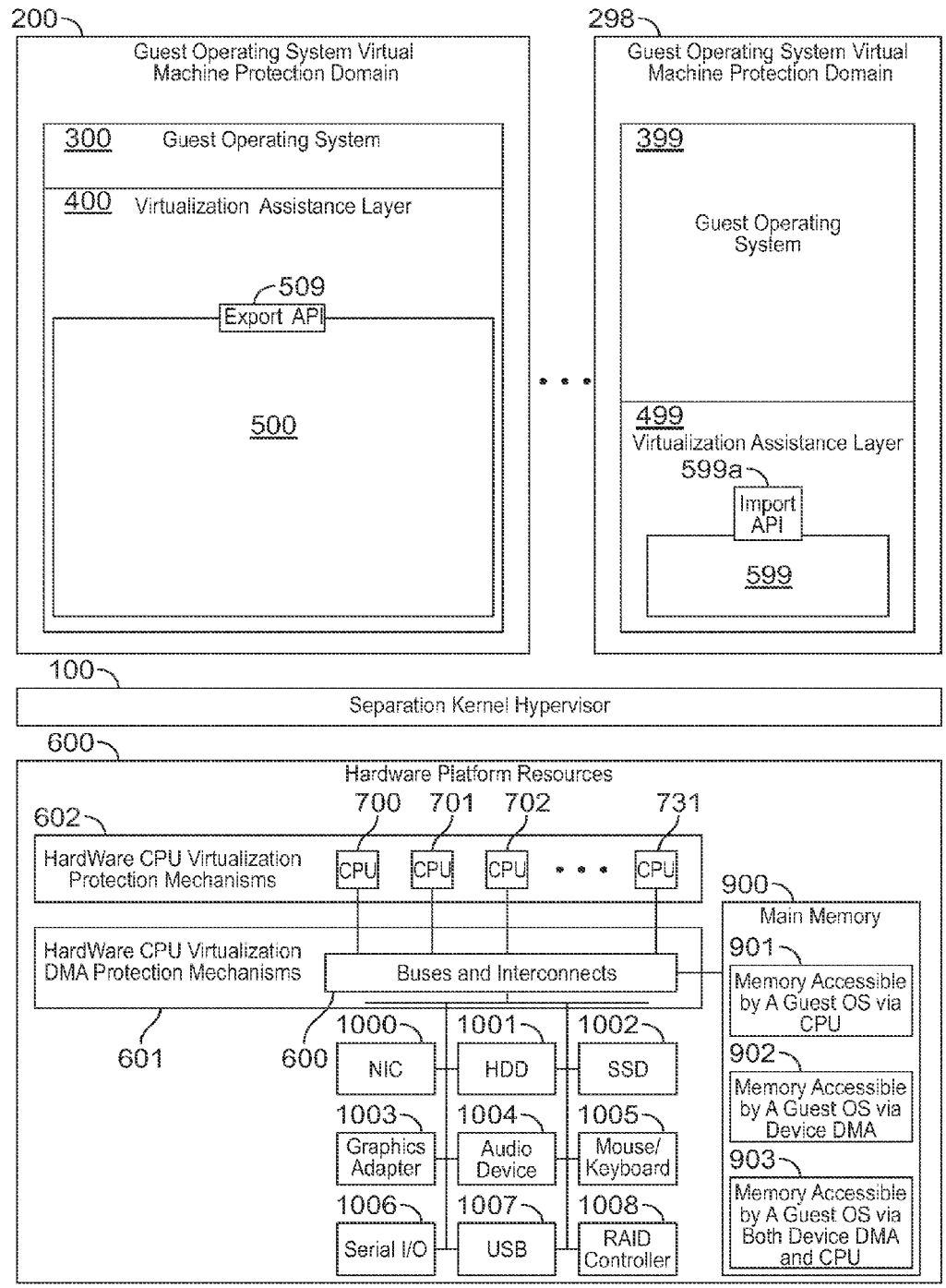
FIG. 5 is a block diagram illustrating an exemplary system and separation kernel hypervisor architecture consistent with certain aspects related to the innovations herein.

FIG. 5 is a block diagram illustrating an exemplary system and separation kernel hypervisor architecture consistent with certain aspects related to the innovations herein. FIG. 5 shows an illustrative implementation as may be associated with FIG. 2, FIG. 3, and/or FIG. 4, where the code execution detection mechanisms, that may be within the virtualization assistance layer, may include the following monitoring systems and mechanisms: memory monitor, an instruction monitor, etc. FIG. 5 also illustrates import/export mechanism that may be used by a virtualization assistance layer and/or code execution detection mechanisms to communicate between themselves and other virtualization assistance layer and/or code execution detection mechanisms in other guest operating system virtual machine protection domains (subject to the security policies established, maintained, and enforced by the separation kernel hypervisor), in an isolated, secure, and even monitored fashion.

FIG. 5 illustrates mechanism and resources that may be used by the code execution detection mechanisms 500 to monitor a guest operating system 300. Such mechanisms and resources may include a memory monitor 501, and an instruction monitor 502.

The virtualization assistance layer 400 and/or the code execution detection mechanisms 500 may also use an export API 509 and/or an import API 599 (as may be configured and governed by the separation kernel hypervisor 100), in order to provide secure communication between a plurality of virtualization assistance layers (e.g., virtualization assistance layers 400 to 499) and/or a plurality of code execution detection mechanisms (e.g., code execution detection mechanisms 500 to 599).

Innovations set forth herein, as also described in additional detail elsewhere herein via notation to the reference numerals in the description below, reside around various interrelated functionality of the following features or aspects: (i) a separation kernel hypervisor that ensures the isolation of multiple guest operating systems each in its own virtual machine (VM); (ii) a separation kernel hypervisor as in (i) that implements a mechanism whereby a suitably authorized guest is configured to send a list of physical memory locations to be watched to another guest; (iii) a separation kernel hypervisor as in (i) that implements a mechanism whereby each of the physical memory locations in (ii) is associated with a specification for what execution context information is to be obtained on access to that location; (iv) a separation kernel hypervisor as in (i) that implements a mechanism whereby the specifications associated with the list of memory locations in (ii) can be sent to the other guest as in (ii); (v) a virtualization assistance layer (VAL) of software that runs within the same protection domain as the guest Virtual Machine but is not directly accessible by the guest; (vi) a virtualization assistance layer as in (vi) that implements a virtual motherboard containing a virtual CPU and memory; (vii) a VAL as in (vi) that implements a mechanism to map physical memory pages as non-executable; (viii) a VAL as in (vi) that processes exceptions caused by non-executable page execution attempts by its associated guest virtual machine; (ix) a VAL as in (vi) that implements a mechanism to determine whether the address accessed is one of those specified in (ii); (x) a VAL as in (vi) that can send a notification of the memory access and associated context information as in (iii) to the requesting guest; (xi) a VAL as in (vi) that can pause the execution of its virtual machine; and/or (xii) a VAL as in (vi) that can resume the execution of its virtual machine.

Systems and mechanisms, and example embodiments, of the code execution detection mechanisms 500 may include:

1. Monitoring of CPU (and CPU cache based) guest OS memory access (originated from a plurality of resources available to the guest operating system 300 (in FIGS. 3 and 4), including CPUs and/or caches assigned and/or associated with such), as directed by execution and resources (shown in FIG. 3) within the guest OS 300. For memory assigned to the guest OS 300, such as a subset of the main memory 900 (in FIGS. 2, 3, 4, and 5) the separation kernel hypervisor 100 may trap access to that memory, and then pass associated data of that trap to the virtualization assistance layer 400. The virtualization assistance layer 400 may then pass the associated data of that trap to the code execution detection mechanisms 500.

The virtualization assistance layer 400, code execution detection mechanisms 500, and/or the separation kernel hypervisor 100 may use feedback mechanisms between themselves to recognize and monitor patterns of guest operating system 300 memory access; not strictly one-off memory access attempts.

The monitoring of guest operating system 300 memory access includes, but is not limited to, constructs in guest operating system 300 memory (including the resources in the guest operating system 300 in FIGS. 3 and 4) which may have semantics specific to a particular guest operating system 300 or a set of applications hosted by the guest operating system 300 (possibly including antivirus software).

The virtualization assistance layer 400, code execution detection mechanisms 500, and/or the Separation Kernel Hypervisor 100 may use feedback mechanisms between themselves to recognize and monitor patterns of Guest Operating System 300 DMA access to memory; not strictly one-off access attempts.

Figure 6A:
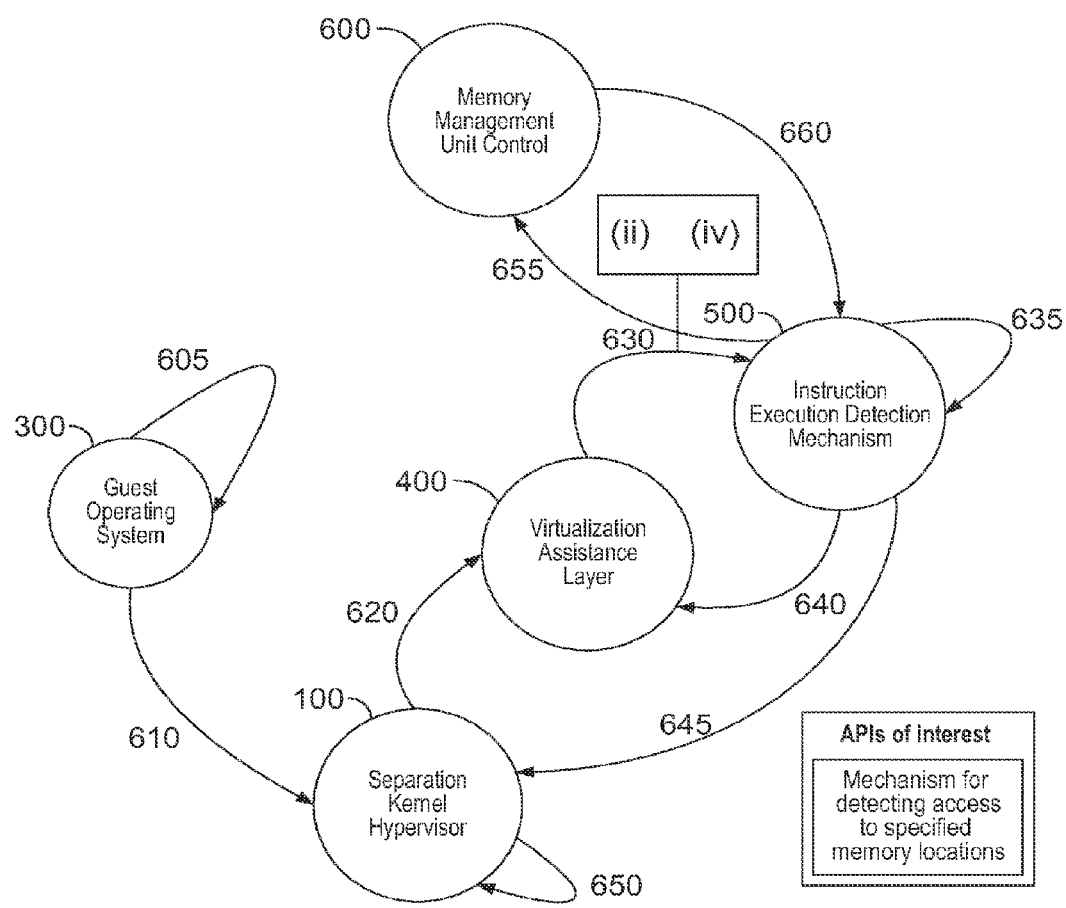
FIGS. 6A-6B are representative sequence/flow diagrams illustrating exemplary systems, methods and separation kernel hypervisor architecture consistent with certain aspects related to the innovations herein.
Figure 6B:
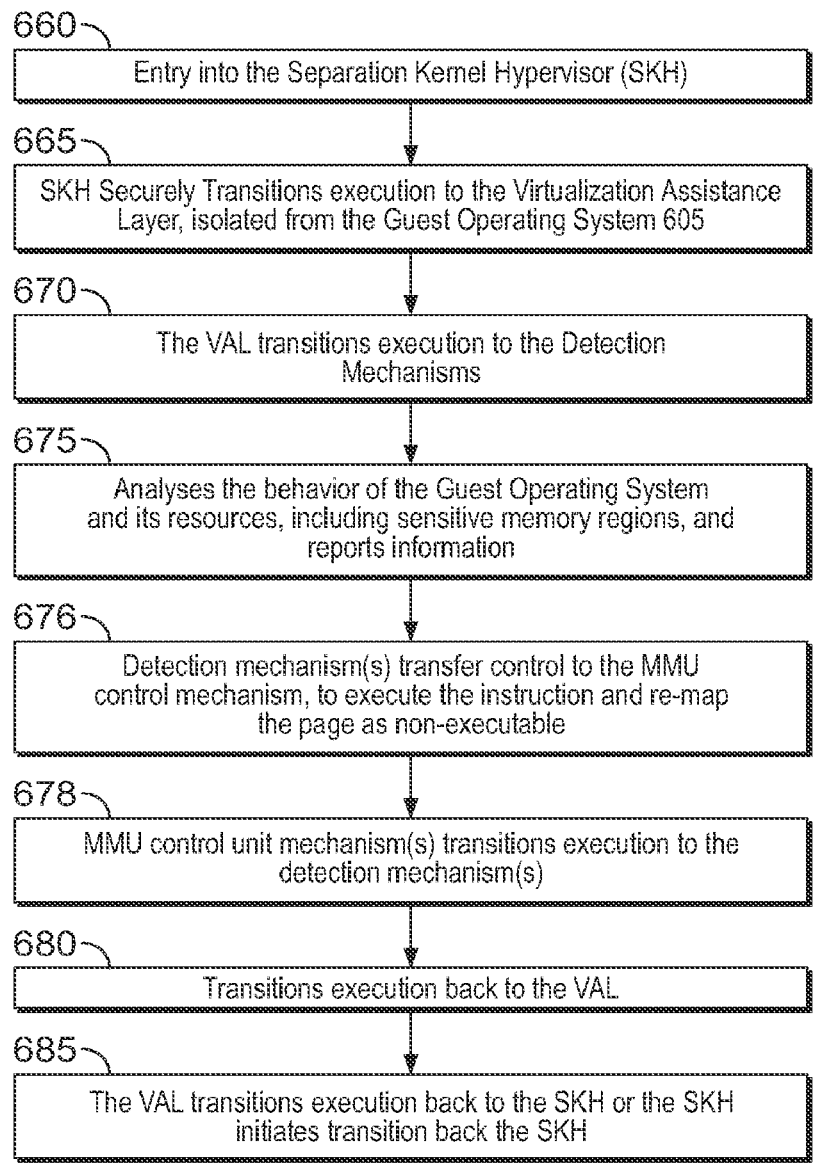

Illustrative aspects, here, are shown in FIGS. 6A-6B.

2. Monitoring of specific Guest Operating System 300 instruction execution attempts, and/or specific instruction sequence execution attempts.

For all such attempts by the Guest Operating System 300, the Separation Kernel Hypervisor 100 (when configured to do so, or via feedback receive from the virtualization assistance layer 400 and/or the code execution detection mechanisms 500) may trap such access attempts, then pass associated data of that trap to the virtualization assistance layer 400 and/or code execution detection mechanisms 500.

The virtualization assistance layer 400 and/or the code execution detection mechanisms 500 can respond to such instruction sequences; including, but not limited to, recognition of a significant fraction of a given sequence, then prevent/block the final instructions of the malicious sequence from execution.

Figure 7A:
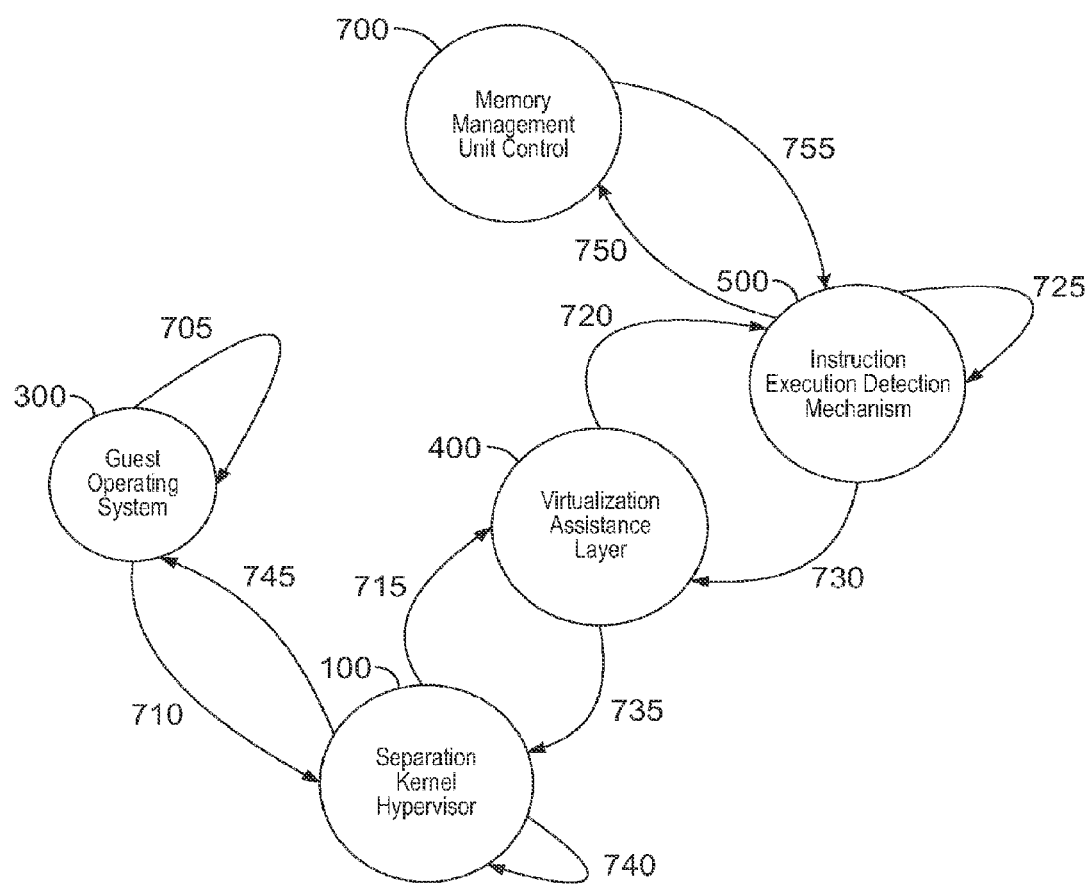
FIGS. 7A-7B are representative sequence/flow diagrams illustrating exemplary systems, methods and separation kernel hypervisor architecture consistent with certain aspects related to the innovations herein.
Figure 7B:
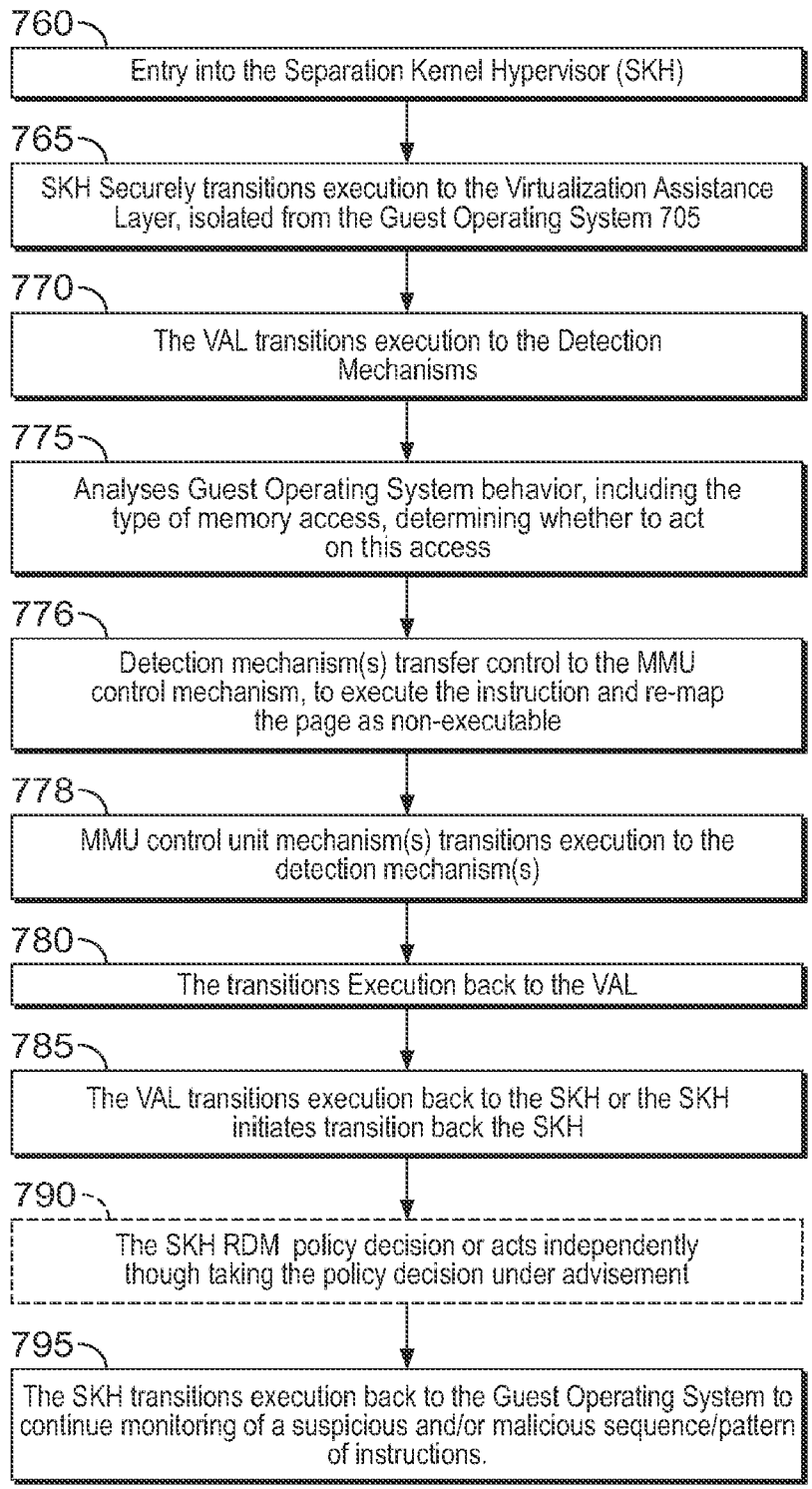

Illustrative aspects, here, are shown in FIGS. 7A-7B.

FIGS. 6A-6B are representative sequence/flow diagrams illustrating exemplary systems, methods and Separation Kernel Hypervisor architecture consistent with certain aspects related to the innovations herein. FIGS. 6A-6B relate, inter alia, to behavior relating to the handling of guest operating system attempts to access main memory.

Turning to the illustrative implementations/aspects of FIG. 6A, at step 605 a Guest Operating System receives a command for memory access to a specified memory location. Then, at step 610, the Guest Operating System attempts to execute code in the memory location(s). The memory usage attempt triggers entry into the Separation Kernel Hypervisor. Then, at step 620, the Separation Kernel Hypervisor securely transitions execution to the virtualization assistance layer; in a manner isolated from the Guest Operating System. Next, in step 630 the virtualization assistance layer transitions execution to the code execution detection mechanisms. Step 630 may encompass steps (ii) and (iv), above, including step (ii) where the Separation Kernel Hypervisor implements a mechanism whereby a suitably authorized guest can send a list of memory locations to be watched to another guest. A virtualization assistance layer (VAL) of software that runs within the same protection domain as the guest virtual machine but is not directly accessible by the guest (step iv). The VAL that processes unmapped memory exceptions taken by its associated guest virtual machine (step vii). Then, at step 635 the code execution detection mechanisms analyze the behavior of the Guest Operating System and its resources and makes a policy decision; in this example, it has been configured to understand the memory locations which are sensitive (contain APIs of interest), thus decides to disallow, pause or continue the code execution. The code execution detection mechanism detects processing/access to specified memory locations, for example. Then, at step 655, the instruction execution detection mechanism 500 transfers control to a memory management unit (MMU) control mechanism 600. This mechanism 600 performs the memory management unit control operations need to execute the instruction and map the appropriate page as non-executable. Additional details of the MMU functionality, here, are set forth further below in connection with FIG. 10. Then, at step 660, the MMU control mechanisms transition execution to the instruction execution detection mechanism. Next, at step 640 the code execution detection mechanisms transition execution to the virtualization assistance layer, passing it the policy decision. Then, at step 645 the virtualization assistance layer transitions execution back to the Separation Kernel Hypervisor, or the Separation Kernel Hypervisor transitions execution from the virtualization assistance layer back to the Separation Kernel Hypervisor. Next, at step 650 the Separation Kernel Hypervisor acts on the policy decision generated by the code execution detection mechanisms (in this example it disallows the attempt to access the API of interest), or the Separation Kernel Hypervisor acts independently of the policy decision, but in a manner that takes the policy decision under advisement (depending on configuration). The SKH may receive, analyze, and/or act upon policy decisions from multiple sources, which may include multiple detection/notification mechanisms; including cases where multiple mechanisms monitor a given Guest OS.

As explained above in connection with FIG. 6A, the Guest Operating System accesses a specified memory location. The memory access may be monitored and identified as including API(s) of interest by the code execution detection mechanism to generate a policy decision. The memory access attempt triggers entry into the Separation Kernel Hypervisor.

Turning to FIG. 6B, such system or process may initiate upon entry into the SKH, at 660. Then, at 665, the Separation Kernel Hypervisor securely transitions execution to the Visualization Assistance Layer; in a manner isolated from the Guest Operating System. Next, at 670, the Visualization Assistance Layer transitions execution to the code execution detection mechanisms. The code execution detection mechanisms may then analyze, at 675, the behavior of the Guest Operating System and its resources and makes a policy decision; for example, it may be configured to understand the memory locations which are sensitive (e.g. contain the APIs of interest), thus decides to deny, pause or continue the memory processing/access attempt. At 676, the detection mechanism(s) may transfer control to a memory management unit (MMU) control mechanism, to execute the instruction and map the appropriate page as inaccessible. Additional details of the MMU functionality, here, are set forth further below in connection with FIG. 10. Once the policy decision(s) have been made, the code execution detection mechanisms transition execution to the virtualization assistance layer, at 680, passing it the policy decision. Then, at 685, the virtualization assistance layer transitions execution back to the Separation Kernel Hypervisor, or the Separation Kernel Hypervisor transitions execution from the virtualization assistance layer back to the Separation Kernel Hypervisor. Finally, at 690, the Separation Kernel Hypervisor acts on the policy decision generated by the code execution detection mechanisms (in this example it denies processing with respect to the APIs of interest, although it may also allow or pause the memory access), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple mechanisms; inducing cases where multiple mechanisms monitor a given Guest OS.

FIGS. 7A-7B are representative sequence/flow diagrams illustrating exemplary systems, methods and Separation Kernel Hypervisor architecture consistent with certain aspects related to the innovations herein. FIGS. 7A-7B relate, inter alia, to behavior relating to an attempt to access specified APIs of interest such as by the handling of guest operating system instruction sequences (e.g., execution attempts of a repeated pattern/series of MOV, RET, or MOV IRET instruction on an Intel IA32e architecture; such patterns of which may constitute code of "return oriented" attacks/rootkits). Here, in such illustrative cases, memory access within the guest operating system will attempt to corrupt and/or subvert antivirus software and/or software integrity checkers within the guest operating system via a "return oriented" attack (attacks constructed to evade integrity checkers); and the code execution detection mechanisms detects/prevents the attack.

Turning to the illustrative implementations/aspects of FIG. 7A, at step 705, a Guest Operating System receives a command for memory access to a specified memory location. Then at step 710 an attempt to access the APIs of interest such as a specific sequence and/or pattern of CPU instructions is performed, that either triggers transition into the SKH for (2a) every instruction in the sequence and/or pattern (a single stepping behavior), or (2b) for a number of instructions of size greater than one of the sequence and/or pattern (multiple stepping). The (2a) or (2b) behavior is based on system configuration. Next, at step 715 the Separation Kernel Hypervisor securely transitions execution to the virtualization assistance layer; in a manner isolated from the Guest Operating System. Then, at step 720 the virtualization assistance layer transitions execution to the code execution detection mechanisms. Next, at step 725 the code execution detection mechanisms analyzes the behavior of the Guest Operating System and its resources and makes a policy decision. Then, at step 750, the instruction execution detection mechanism 500 transfers control to a memory management unit control mechanism 700. This mechanism 700 performs the memory management unit (MMU) control operations need to execute the instruction and map the appropriate page as non-executable. Additional details of the MMU functionality, here, are set forth further below in connection with FIG. 10. Then, at step 755, the MMU control mechanisms transition execution to the instruction execution detection mechanism. Then, in step 730 the code execution detection mechanisms transition execution to the virtualization assistance layer, passing it the policy decision. Next, in step 735 the virtualization assistance layer transitions execution back to the Separation Kernel Hypervisor, or the Separation Kernel Hypervisor transitions execution from the virtualization assistance layer back to the Separation Kernel Hypervisor. Then, in step 740 the Separation Kernel Hypervisor acts on the policy decision generated by the code execution detection mechanisms (in this example it suspends the Guest OS, preventing the Guest OS from accessing the memory and executing the "Return Oriented" attack; a type of attack that thwarts code integrity checkers in the Guest OS), or the Separation Kernel Hypervisor acts independently of the policy decision, but in a manner that takes the policy decision under advisement (depending on configuration). The SKH may receive, analyze, and/or act upon policy decisions from multiple sources, which may include multiple mechanisms; including cases where multiple mechanisms monitor a given Guest OS. Finally, in step 745, in order to continue to recognize sequences and/or patterns of instructions, execution may cycle a multiple times between steps 705 through 740.

As explained above in connection with FIG. 7A, the guest operating system attempts specific memory access of an API of interest. Here, for example, the API of interest is a specified memory location. The attempt triggers entry into the Separation Kernel Hypervisor.

Turning to FIG. 7B, such illustrative system or process may initiates upon entry into the SKH, at 760. Then, at 765, the Separation Kernel Hypervisor securely transitions execution to the Visualization Assistance Layer; in a manner isolated from the Guest Operating System. Next, at 770, the Visualization Assistance Layer transitions execution to the code execution detection mechanisms. The code execution detection mechanisms may then analyze, at 775, the behavior of the Guest Operating System and its resources and makes a policy decision; in this example it recognizes the Guest Operating System instruction sequence and/or pattern as an attempt to access an API of interest, and the policy decision is to made to deny further (and/or future) execution of the sequence and/or pattern, preventing the Guest Operating System from providing the API of interest to the monitored guest. At 776, the detection mechanism(s) may transfer control to a memory management unit (MMU) control mechanism, to execute the instruction and map the appropriate page as inaccessible. Additional details of the MMU functionality, here, are set forth further below in connection with FIG. 10. Then, at 778, the MMU control mechanism(s) may transition execution to the detection mechanism. Once the policy decision(s) have been made, the code execution detection mechanisms transition execution to the virtualization assistance layer, at 780, passing it the policy decision. Then, at 785, the virtualization assistance layer transitions execution back to the Separation Kernel Hypervisor, or the Separation Kernel Hypervisor transitions execution from the virtualization assistance layer back to the Separation Kernel Hypervisor. Optionally, at step 790, the Separation Kernel Hypervisor acts on the policy decision generated by the code execution detection mechanisms (in this example it denies access to the API of interest), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple mechanisms; inducing cases where multiple mechanisms monitor a given Guest OS. In a final step 795, in order to recognize sequences and/or patterns of instructions (and/or further monitor an existing monitored sequence and/or pattern of instructions), execution may cycle a multiple times between steps 760 through 790.

Figure 8:
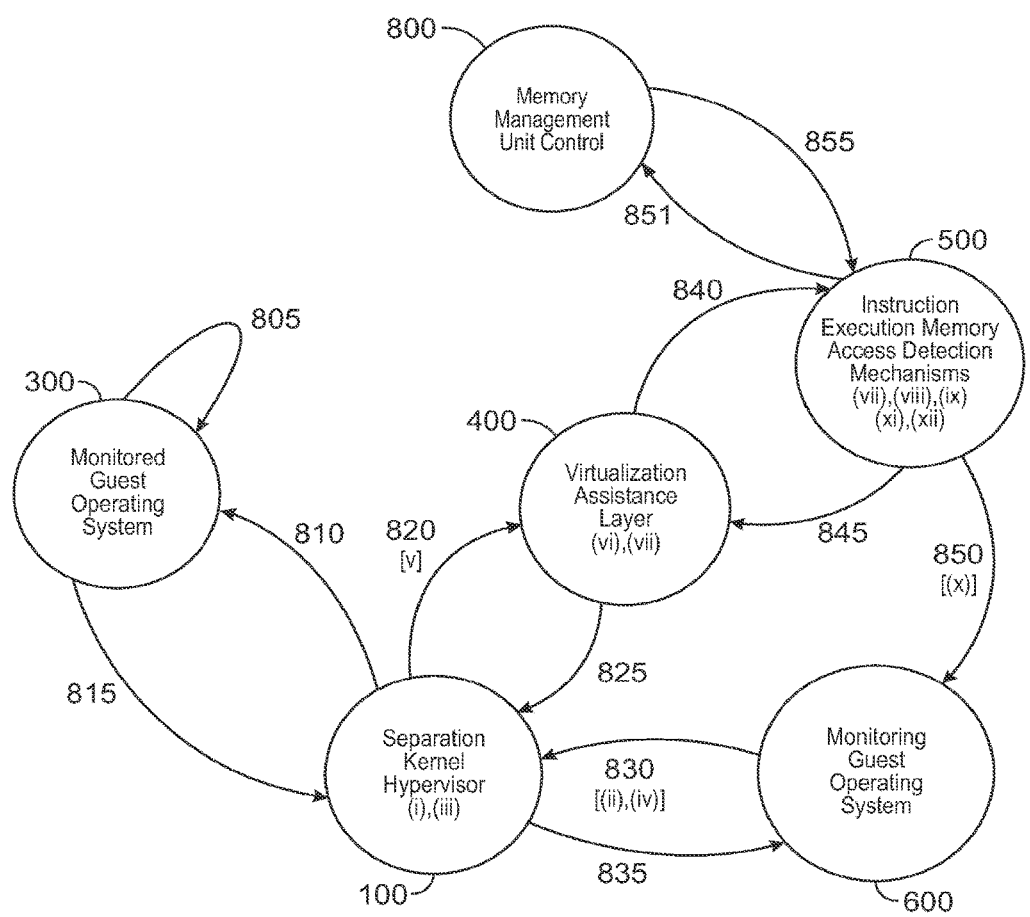
FIG. 8 is a representative sequence diagram illustrating exemplary systems, methods, and separation kernel hypervisor architecture consistent with certain aspects related to the innovations herein.
Figure 9:
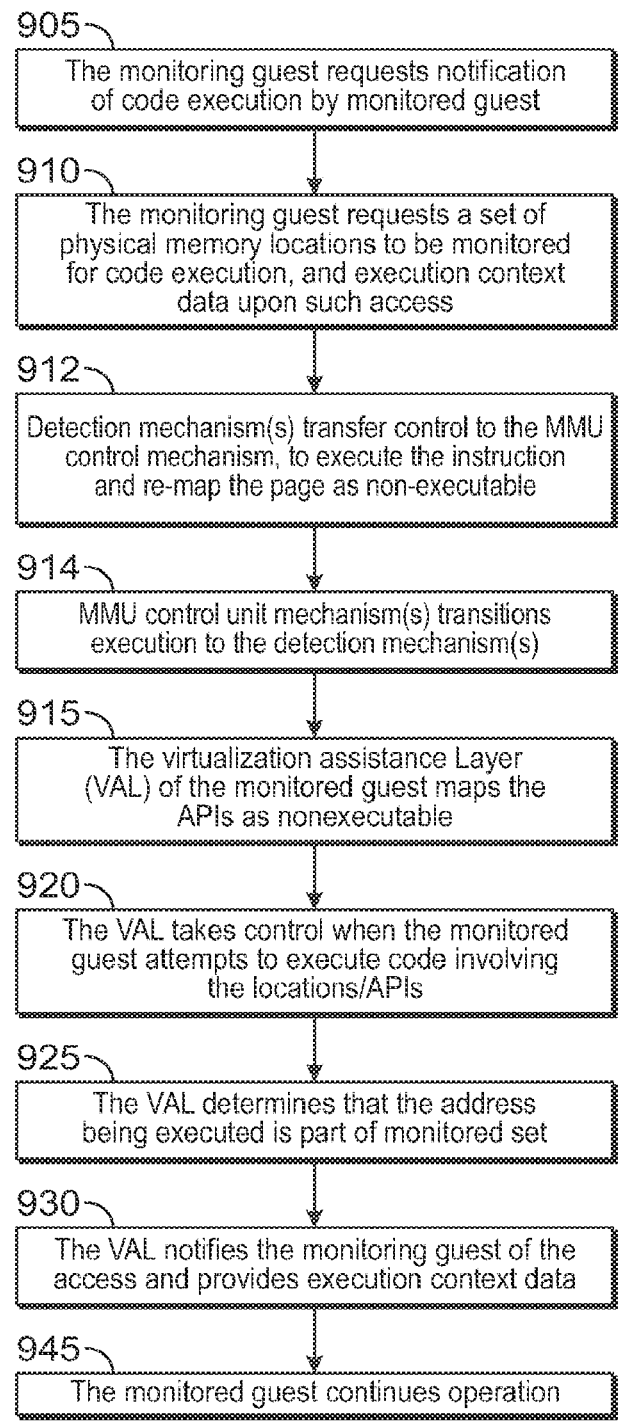
FIG. 9 is a representative flow diagram illustrating exemplary methodology and separation kernel hypervisor processing consistent with certain aspects related to the innovations herein.

FIG. 8 is a representative sequence/flow diagram illustrating exemplary systems, methods, and Separation Kernel Hypervisor processing/architecture consistent with certain aspects related to the innovations herein. FIGS. 8 and 9 relate, inter alia, to the guest operating system executing code at specified memory location(s) where the code execution detection mechanisms monitors, detects, and notifies code execution in specified locations, may obtain information about the context of such execution, and may determine an action in response to the detected execution.

Turning to the illustrative implementations/aspects of FIG. 8, at step 805, a Monitored Guest Operating System 300 attempts to execute code at a specified memory location. Then, at step 815, the attempt is sent to the SKH. The Separation Kernel Hypervisor 100 ensures the isolation of multiple guest Operating Systems each in its own Virtual Machine (VM) (aspects i.). Another Monitored Guest Operating System 600 allows a suitably authorized Monitoring Guest 600 to send, at 830, a list of memory locations to be monitored for another guest 300 (aspects ii. and iv.). Furthermore, a suitably authorized guest 600 may send a message to another guest 300 (aspect iii.). A response from the SKH 100 is provided to the Monitored Guest Operating System 600 at step 810. Next, at step 820 the Separation Kernel Hypervisor securely transitions execution to the virtualization assistance layer 400 in a manner isolated from the Guest Operating System (aspect v.). The Virtualization Assistance Layer (VAL 400) is software that runs within the same protection domain as the guest Virtual Machine but is not directly accessible by the guest (aspect vi.). The Virtualization Assistance Layer 400 implements a virtual motherboard containing a virtual CPU and memory (aspect vii.). The VAL 400 also implements a mechanism to unmap specified APIs on demand from another guest (aspect viii.). Then, at step 840, the virtualization assistance layer transitions execution to the code execution Detection Mechanisms 500, which perform processing of portions or all of aspects vii., viii., ix., xi., xii. Next, the code execution detection mechanisms analyze the behavior of the Guest Operating System and its resources and may make a policy decision. The VAL 400 and mechanism 500 processes unmapped API exceptions taken by its associated guest virtual machine. The policy decisions of the VAL 400 and mechanism 500 include pausing the execution of its associated guest virtual machine, injecting an API-not-found exception into its associated guest virtual machine, or allowing the access to the API to continue. At step 851, the instruction execution detection mechanism 500 may transfer control to a memory management unit control mechanism 800. This mechanism 800 performs the memory management unit (MMU) control operations need to execute the instruction and re-map the appropriate page as non-executable. Additional details of the MMU functionality, here, are set forth further below in connection with FIG. 10. After this, at step 855, the MMU control mechanisms transition execution to the instruction execution detection mechanism. Then, at step 845 the code execution detection mechanisms transition execution to the virtualization assistance layer, passing to it the policy decision. Next, at step 825 the virtualization assistance layer transitions execution back to the Separation Kernel Hypervisor, or the Separation Kernel Hypervisor transitions execution from the virtualization assistance layer back to the Separation Kernel Hypervisor. At step 810, the SKH 100 transitions execution to the Monitored Guest Operating System 300 based on the policy decision. At step 825, the Separation Kernel Hypervisor acts on the policy decision generated by the code execution detection mechanisms, or the Separation Kernel Hypervisor acts independently of the policy decision, but in a manner that takes the policy decision under advisement (depending on configuration). The SKH may receive, analyze, and/or act upon policy decisions from multiple sources, which may include multiple mechanisms; including cases where multiple mechanisms monitor a given Guest OS. At step 850, the mechanism 400 sends a notification of the code execution and associated context information to the requesting guest OS 600 (aspect x.). Then, in order to continue to recognize sequences and/or patterns of code execution, such processing may cycle multiple times between steps 805 through 850.

As explained above in connection with FIG. 8, the Guest Operating System may attempt to execute code in specified memory location(s). The attempt triggers entry into the Separation Kernel Hypervisor for monitoring, detection and/or notification.

Turning to FIG. 9, such illustrative system or process begins where a hypervisor is configured to allow a guest (Monitoring Guest) to request notifications of code execution by another guest (Monitored Guest). For example, the Monitoring Guest may request that code execution at specified locations be monitored (e.g., a set of APIs be monitored), and the action (e.g., pause, disallow, or continue) to be taken on such request, at step 905. The VAL in the Monitored Guest maps those locations/APIs as inaccessible, at step 910. This is distinct from the Monitored Guest's notion of API mappings. At 912, the detection mechanism(s)

may transfer control to a memory management unit (MMU) control mechanism, to execute the instruction and map the appropriate page as non-executable. Additional details of the MMU functionality, here, are set forth further below in connection with FIG. 10. Then, at 914, the MMU control mechanism(s) may transition execution to the detection mechanism. At step 920, when software in the Monitored Guest attempts to execute code in a specified location (e.g., attempts to access an unmapped API), control transitions to the VAL. The VAL determines, for example, that the unmapped API is part of the set to be monitored, at step 925. The VAL notifies the monitoring guest of the attempt, at step 930. The action is determined at step 935 based on the action set by the Monitoring Guest. If the action is pause at step 940, the Monitored Guest is paused. If the action is disallow at step 945, the Monitored Guest is injected with an exception, as though the API did not exist. If the action is continue at step 950, the Monitored Guest is allowed to continue operation as though the API had always been mapped in.

Figure 10:
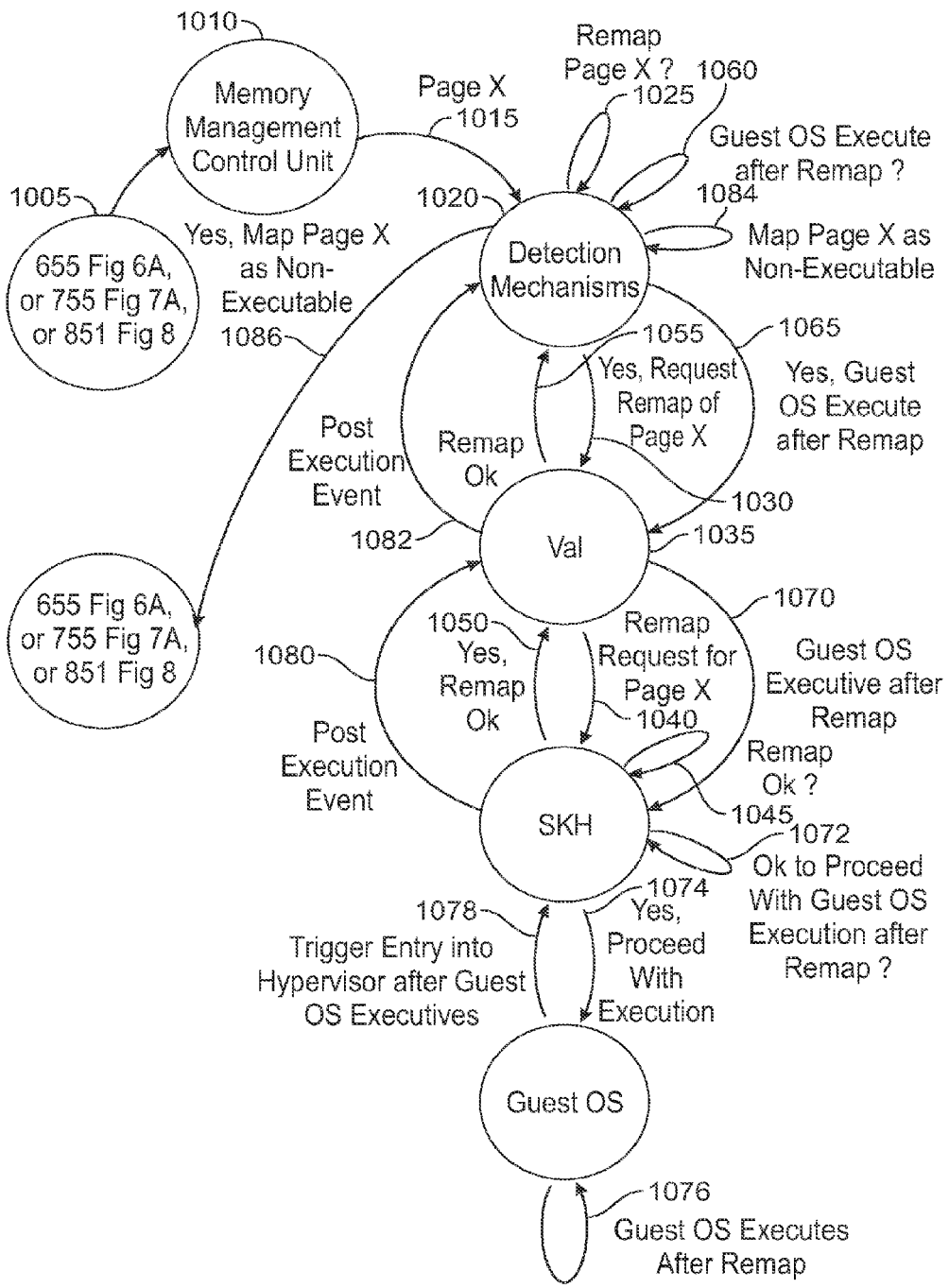
FIG. 10 is an exemplary state diagram illustrating aspects of memory management unit processing in conjunction with the hypervisor and VAL, consistent with certain aspects related to the innovations herein.

FIG. 10 is an exemplary state diagram illustrating aspects of memory management unit processing in conjunction with the hypervisor and VAL, consistent with certain aspects related to the innovations herein. In FIG. 10, control is passed to the Memory Management Unit (MMU) Control 1019 via any of the following control paths 1005 including step 655 (from FIG. 6A), step 755 (from FIG. 7A), and step 851 (from FIG. 8). Step 1015 transitions control from the Memory Management Control Unit 1010 to the detection mechanisms 1020 to make a policy decision regarding the page of memory the GuestOS had attempted to access. The detection mechanisms 1020 execute a policy decision to either deny or allow the GuestOS to access the memory. In step 1025, the detection mechanisms 1020 execute the decision to allow the GuestOS access to the memory.

The detection mechanisms may transition execution to the VAL 1035 with a request that the page of memory the GuestOS had attempted to access be remapped (mapped as accessible) to the GuestOS at step 1030.

The VAL may then transition execution to the SKH with a request that the page of memory the GuestOS had attempted to access be remapped (mapped as accessible) to the GuestOS at step 1040. The SKH executes a policy decision at step 1045 to allow or deny the request that the page of memory the GuestOS had attempted to access be remapped (mapped as accessible) to the GuestOS. In an exemplary embodiment, the SKH allows the request to map the memory page as accessible to the GuestOS.

The SKH may transition execution back to the VAL at step 1050 with a message that the memory page that the GuestOS had attempted to access has been remapped (mapped asaccessible) to the GuestOS. The VAL transitions execution back to the detection mechanisms 1020 at step 1055 with a message that the memory page that the GuestOS had attempted to access has been remapped (mapped as accessible) to the GuestOS.

At step 1060, the detection mechanisms 1020 execute a policy decision to either allow or deny the GuestOS to complete the execution of the command/instruction that the GuestOS had attempted which had triggered the GuestOS access attempt to the memory page.

At step 1065, the detection mechanisms 1020 determine to allow the GuestOS to complete execution of the command/instruction that the GuestOS had attempted which had triggered the GuestOS access attempt to the memory page. The detection mechanisms then transition execution to the VAL 1035.

At step 1070, the VAL 1035 then transitions execution to the SKH with a request to allow the GuestOS to complete execution command/instruction that the GuestOS had attempted which had triggered the GuestOS access attempt to the memory page. The SKH executes a policy decision at step 1072 to allow or deny the GuestOS to complete execution of the command/instruction that the GuestOS had attempted which had triggered the GuestOS access attempt to the memory page. In this example, the SKH allows the GuestOS to complete the execution of that command/instruction. At step 1074, the SKH securely transition execution to the GuestOS. At step 1076, the GuestOS completes execution of the command/instruction that the GuestOS had attempted which triggered the GuestOS access attempt to the memory page. At step 1078, the protection mechanisms provided by the SKH trigger a transition back to the SKH immediately after completion of the GuestOS command/instruction.

At step 1080, the SKH transitions execution back to the VAL 1035, with a message that the GuestOS has completed execution of the command/instruction that the GuestOS had attempted which had triggered the GuestOS access attempt to the memory page. At step 1082, the VAL 1035 transitions execution to the detection mechanisms 1020 with a message that the GuestOS has completed execution of the command/instruction that the GuestOS had attempted which had triggered the GuestOS access attempt to the memory page. At step 1084, the detection mechanisms 1020 determine whether to map the memory page as nonexecutable again. At step 1086, the detection mechanisms 1020 make a transition back to the VAL via any of the control paths including step 600 (from FIG. 6A), step 750 (from FIG. 7A), and step 855 (from FIG. 8).

At a high level, as may apply to the above examples, the Actions taken on monitored activity may include policy based actions taken by, and/or coordinated between, the Separation Kernel Hypervisor 100, virtualization assistance layer 400, and/or code execution detection mechanisms 500 Such actions may include, but are not limited to any of the following: (1) preventing the monitored activity; (2) allowing the monitored activity; (3) allowing the monitored activity, with instrumentation, and/or partial blocking. It may be that certain sub-sets of the activity are permissible (by configuration policy), and that a portion of the activity may be allowed and a portion blocked and/or substituted with a harmless surrogate; such as insertion of no-ops in malicious code to render malicious code inert. This may include run-time patching of CPU state of a guest operating system 300, and/or any resources of the guest operating system 300; (4) reporting on the monitored activity, possibly exporting reports to other software in the system, or on remote systems; and/or (5) performing replay of the monitored activity.

With regard to (5), performing replay of the monitored activity, in Separation Kernel Hypervisor 100 configurations supporting rewind of guest operating system 300 state, the state of the guest operating system 300 can be rewound and the monitored activity can be replayed and re-monitored (to a degree); e.g., if the code execution detection mechanisms 500 requires more systems resources, and/or to map more context of the guest operating system 300, the code execution detection mechanisms 500 may request a rewind, request more resources, then request the replay of the monitored activity; so that the code execution detection mechanisms 500 may perform analysis of the monitored activity with the advantage of more resources. Systems and methods of monitoring activity, as may be utilized by the Separation Kernel Hypervisor 100, virtualization assistance layer 400, and/or code execution detection mechanisms 500; for activities which may include guest operating system 300 activities, and/or Separation Kernel Hypervisor 100, virtualization assistance layer 400, and/or code execution detection mechanisms 500 activities (such as feedback between such components), including those activities which may cause transition to the Separation Kernel Hypervisor 100, virtualization assistance layer 400, and/or code execution detection mechanisms 500 include (but are not limited to): Synchronous, bound to a specific instruction stream and/or sequence within a processor, CPU, or platform device and/or ABI, certain elements of which can be used to trap and/or transition to/from the hypervisor. For example, instructions which induce trapping. Such events may be generated by the Separation Kernel Hypervisor 100, virtualization assistance layer 400, and/or code execution detection mechanisms 500.

The innovations and mechanisms herein may also provide or enable means by which software and/or guest operating system vulnerabilities, including improper use of CPU interfaces, specifications, and/or ABIs may be detected and/or prevented; including cases where software vendors have implemented emulation and/or virtualization mechanisms improperly.

Implementations and Other Nuances

The innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, appliances, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other non-transitory media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Other non-transitory media may comprise computer readable instructions, data structures, program modules or other data embodying the functionality herein, in various non-transitory formats. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer, to processing/graphics hardware, and the like. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., Silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not include transitory media such as carrier waves.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertain that variations and modifications of the various implementations shown and described herein may be made without departing from the spirit and scope of the inventions. Accordingly, it is intended that the inventions be limited only to the extent required by the applicable rules of law.

What is claimed is:

1. A method for processing information securely, the method comprising:
   partitioning hardware platform resources via a separation kernel hypervisor into a plurality of guest operating system virtual machine protection domains each including a virtual machine;
   providing a virtualization assistance layer (VAL) in each of the protection domains;
   isolating and/or securing the domains in time and/or space from each other;
   hosting a map mechanism to unmap specified pages on demand from another guest;
   processing an unmapped page exception taken by the virtual machine;
   mapping the previously unmapped page;
   sending a notification of memory access and associated context information to a requesting guest, wherein the virtual machine comprises a virtual motherboard including a virtual CPU and memory;
   allowing the virtual machine to execute a single instruction;
   returning control to the VAL;
   mapping the page as inaccessible again; and
   returning control to the virtual machine.

2. The method of claim 1, further comprising:
   configuring a memory management unit such that software in the virtual machine cannot undo the mapping.

3. The method of claim 1, further comprising:
   implementing at least one routine and/or component to prohibit the guest operating systems from tampering with, corrupting, and/or bypassing the detection mechanism(s); and
   executing the detection mechanism(s) while preventing interference, bypassing, corrupting, and/or tampering by the plurality of guest operating systems.

4. The method of claim 1 wherein:
   the plurality of guest operating system virtual machine protection domains includes corresponding guest operating systems; and
   wherein isolating the loss of security in one of the guest operating system virtual machine protection domains to the one lost security domain such that security is not broken in all the domains.

5. The method of claim 1 wherein:
   moving virtualization processing to the virtual hardware platforms within each guest operating system protection domain so that substantially all analysis and security testing is performed within each guest operating system protection domain such that the separation kernel hypervisor is of reduced size and/or complexity.

6. The method of claim 1, wherein the detection mechanism(s) include subcomponents and/or subroutines configured for monitoring of guest operating system memory access.

7. The method of claim 1, further comprising:
   executing one or more detection mechanisms while preventing interference and/or corruption tampering and/or bypassing by the plurality of guest operating system virtual machine protection domains.

8. The method of claim 7, wherein the one or more detection mechanisms include subcomponents and/or subroutines configured for monitoring actions of the guest operating system including mitigation, prevention, and/or modification of code, data, execution flow, and/or resource utilization at runtime, as detected by the detection mechanism.

9. The method of claim 7, wherein the one or more detection mechanisms include subcomponents and/or subroutines configured for monitoring actions of the guest operating system including reporting upon of suspect code, data, execution flow, and/or resource utilization at runtime, as detected by the detection mechanism.

10. The method of claim 7, further comprising:
enforcing policy for activities monitored by the one or more detection mechanisms within the guest operating system virtual machine protection domain.

11. The method of claim 1, wherein the virtualization assistance layer virtualizes portions of the hardware platform resources including a virtual CPU/ABI, a virtual chipset ABI, a set of virtual devices, a set of physical devices, and firmware exported to the corresponding guest operating system.

12. The method of claim 1, further comprising:
configuring a memory management unit such that software in the virtual machine cannot undo a remapping.

13. The method of claim 1, further comprising:
configuring a memory management unit such that software in the virtual machine cannot undo an unmapping.

14. A method for processing information securely, the method comprising:
partitioning hardware platform resources via a separation kernel hypervisor into a plurality of guest operating system virtual machine protection domains each including a virtual machine;
isolating and/or securing the domains in time and/or space from each other;
hosting a mechanism to unmap specified pages on demand from another guest;
processing an unmapped page exception taken by the virtual machine;
mapping the previously unmapped page; and
sending a notification of memory access and associated context information to a requesting guest.

15. The method of claim 14 wherein the virtual machine comprises a virtual motherboard including a virtual CPU and memory.

16. The method of claim 14, further comprising:
allowing the virtual machine to execute a single instruction; and
returning control to a virtualization assistance layer (VAL) within a protection domain associated with the virtual machine.

17. The method of claim 14, further comprising:
detecting in each of the domains their own malicious code as a function of the isolated domains; and
enabling viewing the virtual hardware platform within each domain as separate hardware by a guest such that bypass is prevented.

18. The method of claim 14, further comprising:
executing one or more detection mechanisms that include subcomponents and/or subroutines configured for monitoring actions of the guest operating system including observation, detection, and/or tracking of code, data, execution flow, and/or resource utilization at runtime.

19. The method of claim 18, further comprising:
monitoring for suspect code via the one or more detection mechanisms; and
ascertaining where code is at least one of operating, hiding, halted, stalled, infinitely looping, making no progress beyond intended execution, stored, once-active, extinct and/or not present but having performed suspect and/or malicious action, and/or in a position to maliciously affect a resource under control of a hypervisor guest.

20. The method of claim 14, further comprising:
trapping access to memory assigned to a guest operating system;
passing the trapped memory to the detection mechanism via a virtualization assistance layer.

\* \* \* \* \*